(12) United States Patent
Harada et al.

(10) Patent No.: US 9,585,158 B2
(45) Date of Patent: Feb. 28, 2017

(54) BASE STATION APPARATUS, COMMUNICATION SYSTEM, COMMUNICATION METHOD

(71) Applicant: FUJITSU LIMITED, Kawasaki-shi, Kanagawa (JP)

(72) Inventors: Yuya Harada, Fukuoka (JP); Dai Kimura, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 124 days.

(21) Appl. No.: 14/600,409

(22) Filed: Jan. 20, 2015

(65) Prior Publication Data
US 2015/0131594 A1 May 14, 2015

Related U.S. Application Data

(63) Continuation of application No. PCT/JP2012/074725, filed on Sep. 26, 2012.

(51) Int. Cl.
H04W 72/08 (2009.01)
H04W 72/04 (2009.01)
H04B 7/02 (2006.01)

(52) U.S. Cl.
CPC ....... H04W 72/082 (2013.01); H04W 72/048 (2013.01); H04B 7/024 (2013.01)

(58) Field of Classification Search
None
See application file for complete search history.

(56) References Cited

U.S. PATENT DOCUMENTS

| 8,917,614 | B2 * | 12/2014 | Luo | H04B 7/024 370/252 |
| 9,172,438 | B2 * | 10/2015 | Koivisto | H04B 7/024 |
| 2009/0092086 | A1 * | 4/2009 | Lee | H04B 7/2615 370/329 |
| 2010/0240312 | A1 * | 9/2010 | Peng | H04W 72/02 455/63.1 |

(Continued)

FOREIGN PATENT DOCUMENTS

JP 2011-55497 A 3/2011
WO 2009/123146 A1 10/2009

OTHER PUBLICATIONS

Notice of Reasons for Rejection issued for corresponding Japanese Patent Application No. 2014-537906 mailed on Feb. 16, 2016 with a partial English translation.

(Continued)

Primary Examiner — Hong Cho
(74) Attorney, Agent, or Firm — Myers Wolin, LLC

(57) ABSTRACT

A base station apparatus is disclosed. The base station apparatus includes a classification unit configured to classify mobile station apparatuses connected to a first cell into a CoMP target mobile station apparatus and a CoMP non-target mobile station apparatus, a first allocation unit configured to allocate a wireless resource to the CoMP target mobile station apparatus connected to the first cell, and a second allocation unit configured to determine the wireless resource to be allocated to the CoMP non-target mobile station apparatus connected to the first cell so as to reduce interference with a wireless resource allocated to a CoMP target mobile station apparatus connected to a second cell different from the first cell.

15 Claims, 19 Drawing Sheets

(56) References Cited

U.S. PATENT DOCUMENTS

| | | | |
|---|---|---|---|
| 2010/0317355 A1 | 12/2010 | Zangi et al. | |
| 2011/0105138 A1* | 5/2011 | Morimoto | H04W 28/16 455/452.2 |
| 2011/0237272 A1* | 9/2011 | Gorokhov | H04B 7/024 455/452.1 |
| 2012/0082082 A1 | 4/2012 | Etemad et al. | |
| 2012/0178462 A1* | 7/2012 | Kim | H04W 72/048 455/450 |
| 2013/0021929 A1* | 1/2013 | Kim | H04B 7/024 370/252 |
| 2014/0044061 A1* | 2/2014 | Yue | H04W 72/042 370/329 |

OTHER PUBLICATIONS

Written Opinion of the International Searching Authority issued for corresponding International Patent Application No. PCT/JP2012/074725, mailed Nov. 27, 2012, with a partial English translation.
Liu et al., "A Novel Transmission Scheme and Scheduling Algorithm for CoMP-SU-MIMO in LTE-A System", IEEE Copyright 2010.
International Search Report issued for corresponding International Patent Application No. PCT/JP2012/074725, mailed on Nov. 27, 2012.

* cited by examiner

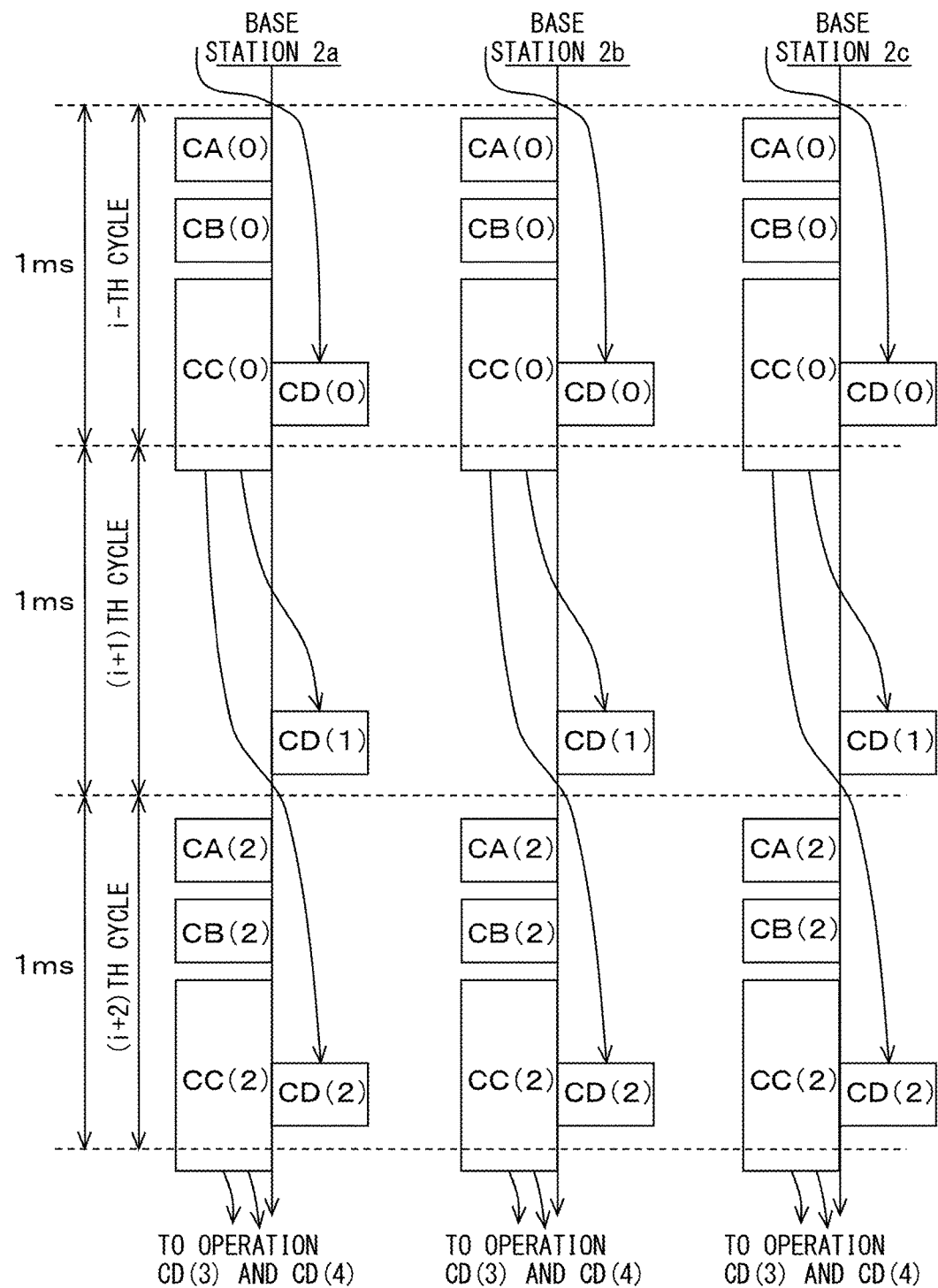

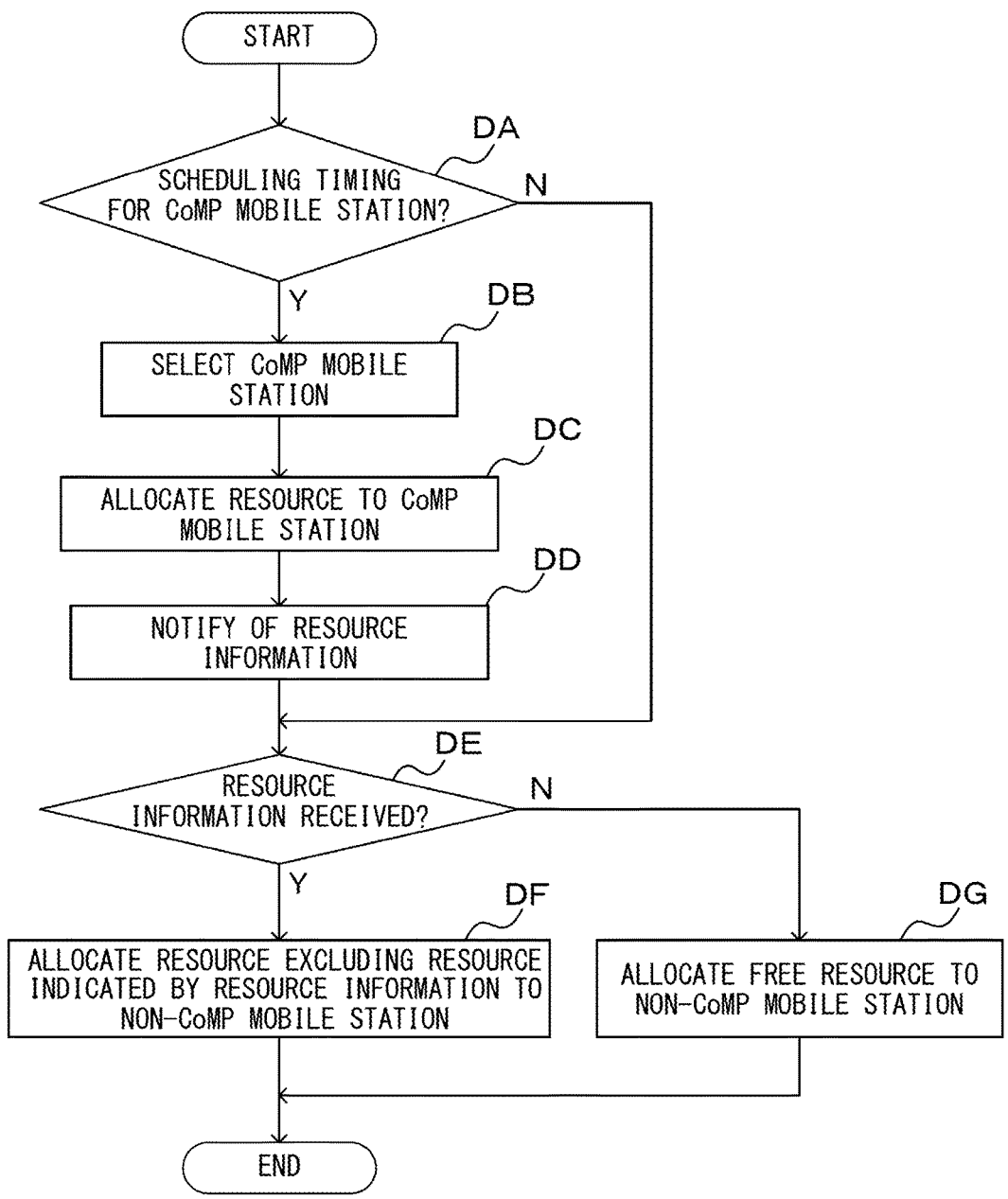

BASE STATION APPARATUS, COMMUNICATION SYSTEM, COMMUNICATION METHOD

CROSS-REFERENCE TO RELATED APPLICATION(S)

This application is a continuation application of International Application PCT/JP 2012/074725, filed on Sep. 26, 2012, now pending, the entire contents of which are herein wholly incorporated by reference.

FIELD

Embodiments discussed herein relate to a base station apparatus, a communication system and a communication method.

BACKGROUND

Coordinated Multi-Point transmission (CoMP) is known as one methods for uniforming a throughput in a mobile wireless system for performing communications between a base station apparatus (eNodeB) and a mobile station apparatus (User Equipment: UE). The CoMP enables the same signal to be transmitted in the same frequency bandwidth to the same mobile station apparatus from a plurality of adjacent cells. Alternatively, the CoMP enables avoidance of interference with the mobile station apparatus so that each of the plural adjacent cells stops outputting in a frequency resource for transmitting the signal to the mobile station apparatus from another cell. Thus, the CoMP is a scheme for improving a throughput by increasing SINR (Signal to Interference plus Noise Ratio) in a specified mobile station apparatus through coordination of the plurality of cells. The cell coordination may be replaced by sector coordination.

Jing L I et al., "A Novel Transmission Scheme and Scheduling Algorithm for CoMP-MIMO in LTE-A System", Beijing University of Posts and Telecommunications Beijing P.R. China, 100876

SUMMARY

According to one aspect of an apparatus, a base station apparatus is provided. The base station apparatus includes a classification unit to classify mobile station apparatuses connected to a first cell into a Coordinated Multi-Point transmission (CoMP) target mobile station apparatus and a CoMP non-target mobile station apparatus, a first allocation unit to allocate a wireless resource to the CoMP target mobile station apparatus connected to the first cell, and a second allocation unit to determine the wireless resource to be allocated to the CoMP non-target mobile station apparatus connected to the first cell so as to reduce interference with a wireless resource allocated to a CoMP target mobile station apparatus connected to a second cell different from the first cell.

Objects and advantages of the present invention are materialized and attained by using elements given in the scope of claims and combinations thereof. Both the general description and the following in-depth description thereof are exemplifications and explanations, and may not be construed as limiting the present invention as in the scope of claims.

BRIEF DESCRIPTION OF DRAWINGS

FIG. 16 is a diagram illustrating a second example of the processing sequence of the communication system.

FIG. 17 is an explanatory diagram in a second example of the operation of the base station apparatus.

DESCRIPTION OF EMBODIMENTS

In the CoMP, the plural cells to be coordinated are grouped, and a single base station apparatus or controller performs concentrated scheduling of the wireless resources of the mobile station apparatuses connected to the cells belonging to each group. The group of the plural cells to be coordinated is called a "cluster". The base station apparatus configuring the cell belonging to the cluster transmits information of the mobile station apparatus with its connection being active to an apparatus that executes scheduling via a backhaul network. The apparatus, which executes scheduling, aggregates items of information of the mobile station apparatuses located within the cluster.

As the number of cells belonging to one cluster becomes larger, there may be more increased options because of an expanded range of the coordinated cells, and hence an improvement of the throughput is expected. However, as the number of cells belonging to each cluster increases, coverage of the base station apparatus expands, which transmits the information of the mobile station apparatuses to the apparatus that executes scheduling. Further, as the number of cells belonging to each cluster rises, the number of mobile station apparatuses located within the cluster increases, and therefore a quantity of information flowing within the network becomes large. Consequently, when the number of cells belonging to one cluster increases, a load on the backhaul network for notification of the information of the mobile station apparatuses is augmented.

Moreover, it may be sufficient that the scheduling not involving the CoMP takes account of fairness, a state of propagation path, etc., between the mobile station apparatuses connected to the respective cells on a cell-by-cell basis. While on the other hand, the scheduling involving the CoMP takes account of the fairness, the state of propagation path, etc., between the mobile station apparatuses in the whole cluster and also takes into consideration a possibility of reducing a quantity of interference owing to the CoMP, resulting in an undesirable possibility of a scheduling algorithm becoming complicated.

An apparatus or a method disclosed in the specification aims at reducing a load on a scheduling process involving the CoMP.

<1. First Embodiment>
<1.1 Architecture of Communication System>

Figure 1:
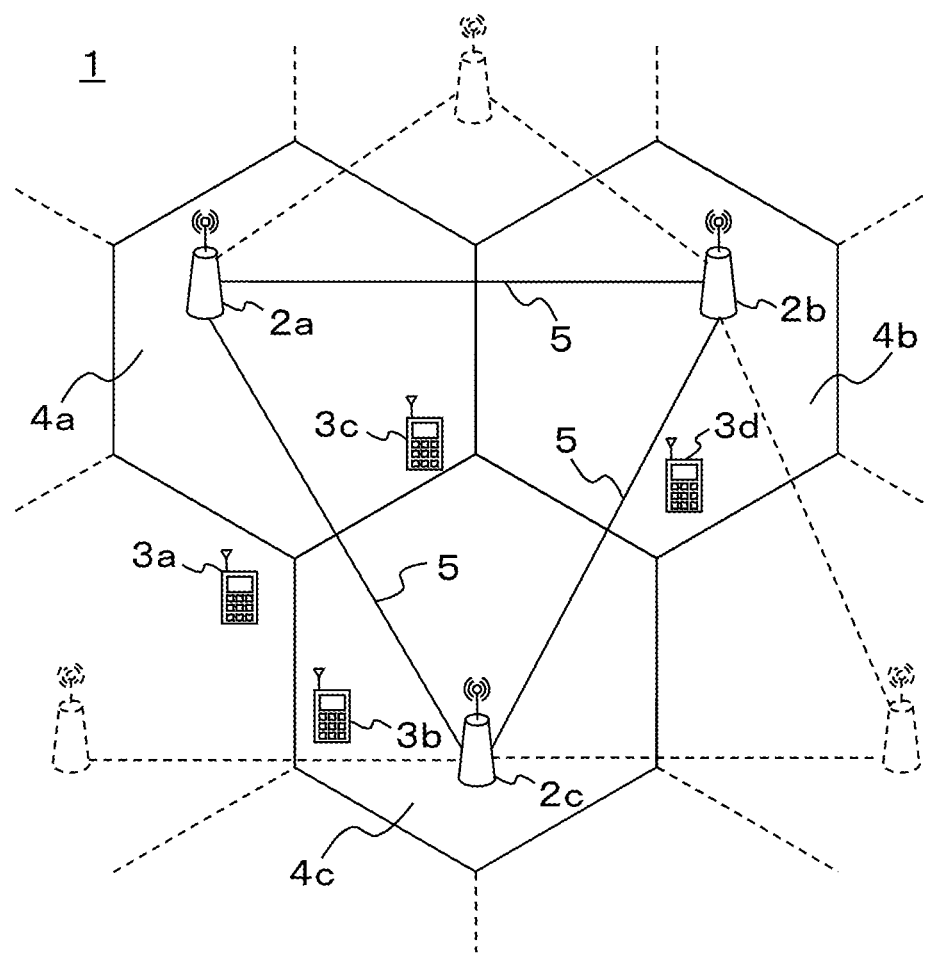
FIG. 1 is an explanatory diagram of an embodiment of a communication system.

An exemplary embodiment will hereinafter be described with reference to the accompanying drawings. FIG. 1 is an explanatory diagram of an example of architecture of a communication system. A communication system 1 includes base station apparatuses (eNodeBs) 2a-2c and mobile station apparatuses (User Equipments (UEs)) 3a-3d. In the following description and drawings, the base station apparatus and the mobile station apparatus will be simply referred to as the "base station" and the "mobile station" as the case may be. Further, the base stations 2a-2c will be generically termed the "base station 2", and the mobile stations 3a-3d will be generically termed the "mobile station 3" as the case may be. FIG. 1 illustrates the four mobile stations 3a-3d, however, the specification does not intend to limit the number of mobile stations. Moreover, the following discussion will exemplify operations of the three base stations 2a-2c; however, the exemplification does not intend to limit the number of base stations.

The base station 2 is defined as a wireless communication apparatus performing wireless communications by establishing a wireless connection with the mobile station 3. The base station 2 is capable of providing a variety of services such as voice/sound communications and video distributions to the mobile station 3 within a single or a plurality of cell areas. The base station 2 connects to other base stations via cable connections 5, for example, utilizing optical transmission, and is thereby enabled to transmit and receive various categories of information to and from other base stations 2.

Cells designated by reference symbols 4a-4c are configured by the base stations 2a-3c (2c), respectively. The following discussion in the specification is based on an assumption that a single cluster is configured by the cells 4a-4c, and the cells 4a-4c cooperate to implement CoMP (Coordinated Multi-Point transmission). In the following description and drawings, the cells 4a-4c will be generically termed the "cell 4" as the case may be.

Figure 2:
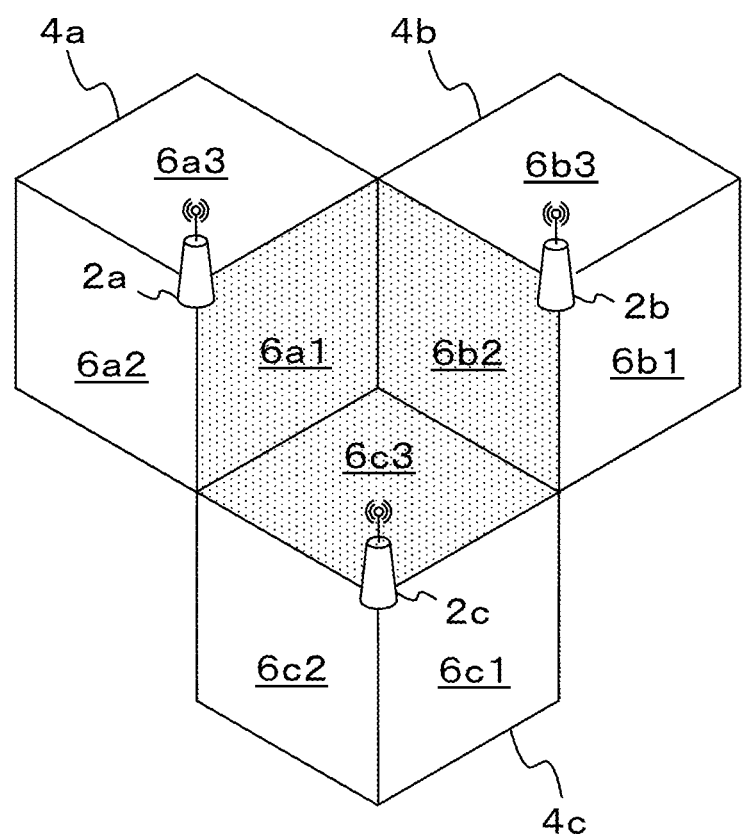
FIG. 2 is an explanatory diagram of an example of a configuration of another cluster.

In other embodiments, one cell may be segmented into a plurality of sectors, and the sectors may be grouped to configure the cluster. FIG. 2 is an explanatory diagram of another example of a configuration of the cluster. The cell 4a is segmented into sectors 6a1-6a3, the cell 4b is segmented into sectors 6b1-6b3, and the cell 4c is segmented into sectors 6c1-6c3. The cluster is configured by grouping the sectors 6a1, 6b2, 6c3.

Figure 3:
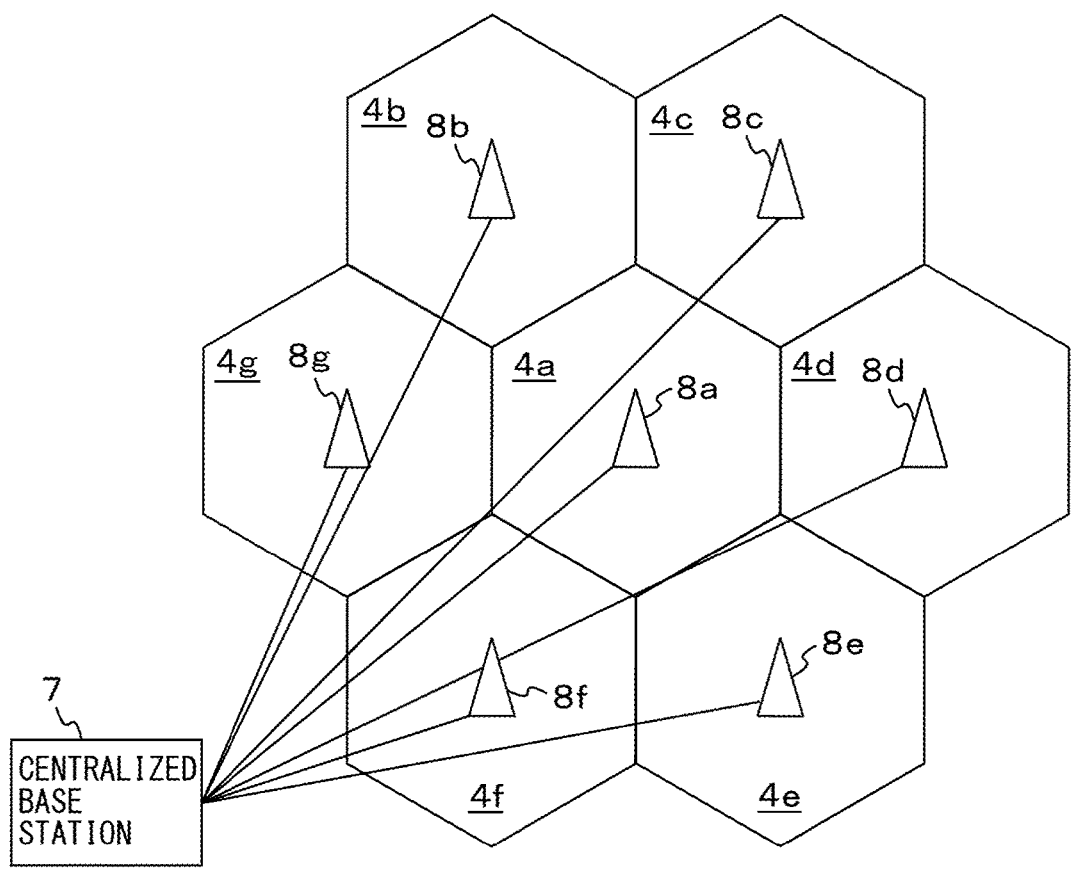
FIG. 3 is an explanatory diagram of a modified example of the communication system in FIG. 1.

Another embodiment allows the cluster to be configured by grouping the cells formed by remote wireless devices each called "RRH (Remote Radio Head)". FIG. 3 is an explanatory diagram of a modified example of the communication system in FIG. 1. RRHs 8a-8g are defined as wireless communication devices each built up by independently separating an antenna and a radio unit of the wireless base station apparatus, the RRHs configuring cells 9a-9g, respectively. The RRHs 8a-8g are connected to a centralized base station 7 taking charge of a baseband signal process and a scheduling process via a fast interface such as the optical transmission.

The communication system disclosed in the specification will hereinafter be described based on the architecture depicted in FIG. 1. The embodiment is applicable to architecture of the communication system in FIG. 3 by replacing transmission and reception of signals between the base stations 2 with the transmission and the reception of the signals within the centralized base station 7.

<1.2. Description of Operation>

Figure 4:
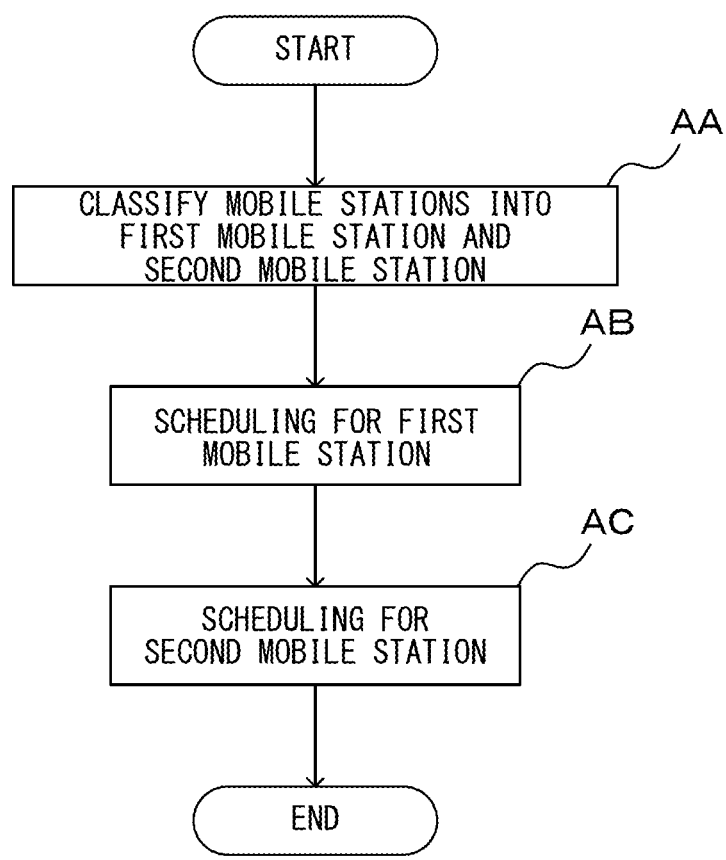
FIG. 4 is an explanatory diagram of a first example of a scheduling operation.
Figure 5:
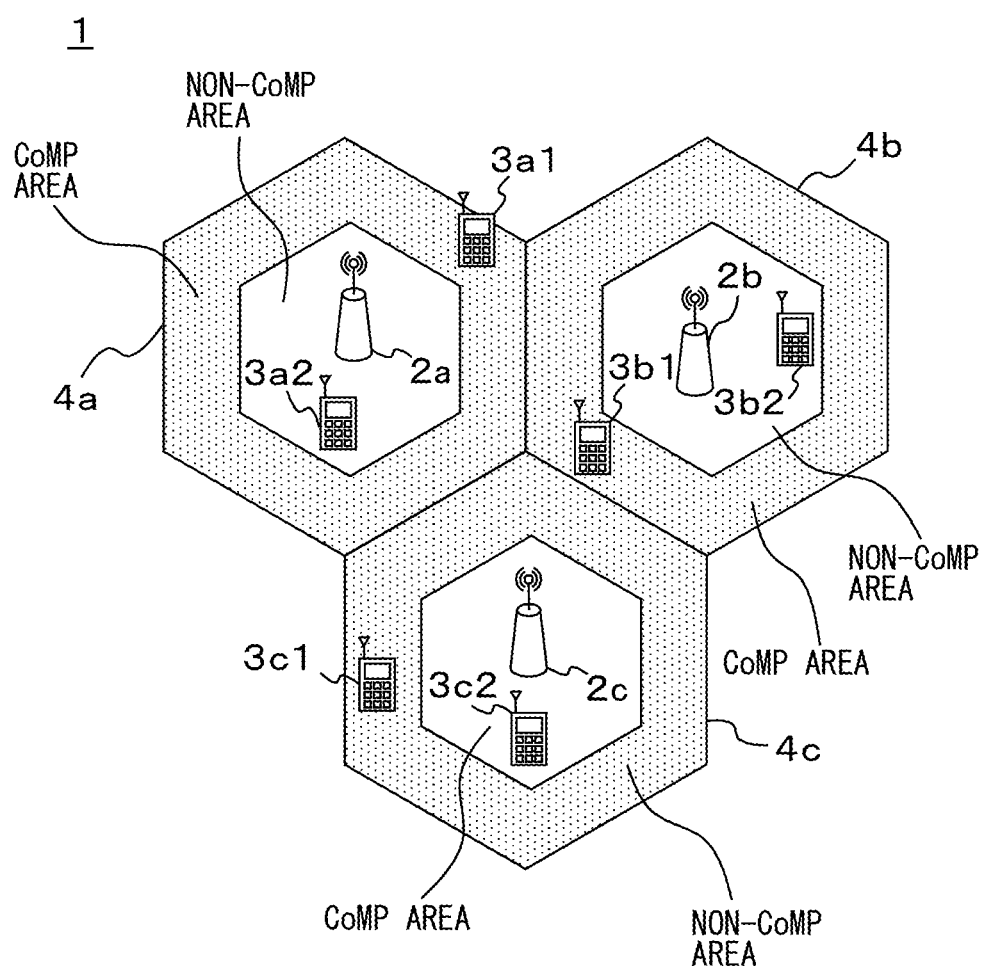
FIG. 5 is an explanatory diagram of how the mobile station apparatuses are classified.

A scheduling operation in the communication system 1 will be described. FIG. 4 is an explanatory flowchart of the first example of the scheduling operation. The operation in FIG. 4 is periodically executed at a predetermined execution interval such as a scheduling period given by the base station 2.

In an operation AA, each of the base stations 2a-2c classifies the mobile stations 3 connected to the base station into a first mobile station and a second mobile station. The first mobile station performs a CoMP communication, while the second mobile station does not perform the CoMP communication.

For example, the base station 2 may divide, based on some sort of standard, an area of the cell 4 configured by each base station 2 into a CoMP area in which to perform the CoMP communication and a non-CoMP area in which not to perform the CoMP communication. The base station 2a classifies the mobile station 3a1 located in the CoMP area into the first mobile station and the mobile station 3a2 located in the non-CoMP area into the second mobile station, respectively.

Similarly, the base station 2b classifies the mobile station 3b1 located in the CoMP area into the first mobile station and the mobile station 3b2 located in the non-CoMP area into the second mobile station, respectively. The base station 2c classifies the mobile station 3c1 located in the CoMP area into the first mobile station and the mobile station 3c2 located in the non-CoMP area into the second mobile station, respectively.

Reference to FIG. 4 is made. In an operation AB, the base station 2 performs scheduling a wireless resource allocated to the mobile station 3 classified as the first mobile station connected thereto in advance of the mobile station 3 classified as the second mobile station.

In an operation AC, the base station 2 performs scheduling the wireless resource allocated to the mobile station 3 classified as the second mobile station connected thereto. On this occasion, the base station 2 performs scheduling the wireless resource allocated to the second mobile station to reduce a degree of how much the wireless resource allocated to the second mobile station within another cell interferes with the wireless resource allocated to the first mobile station within a certain cell. For example, in each cell, the transmission in a frequency band allocated to the first mobile station in another cell is stopped, or alternatively a beam direction of outputting radio waves of the frequency band is adjusted, Thereafter, the base station 2 stands by or halts till a next event trigger for the execution is reached.

When the cell covering the location of the second mobile station and the cell covering the location of the first mobile station are configured by the different base stations, the base station 2 with the cell covering the location of the first mobile station may transmit resource information of the wireless resource allocated to the first mobile station to the base station 2 with the cell covering the location of the second mobile station.

<1.3. Effect>

In the first embodiment, the scheduling process involving the CoMP is carried out per plurality of cells belonging to the individual cell. Therefore, a scheduling algorithm can be simplified as compared with executing the scheduling processes in concentration for the mobile station apparatuses existing in the cluster throughout. As a result, a load on the scheduling process involving the CoMP is reduced.

Further, the scheduling processes are distributed to between or among the plural base stations configuring the respective cells, and hence a high throughput for concentratedly executing the scheduling processes within the cluster becomes unnecessary. Moreover, a network load is reduced because of eliminating a necessity for a process of aggregating pieces of information of the mobile station apparatuses on the apparatus to concentratedly execute scheduling for the mobile station apparatuses being located within the cluster. For example, the base station 2 may simply replace only the resource information of the wireless resource allocated to the first mobile station, and the network load due to the scheduling process is therefore reduced.

<2. Second Embodiment>

<2.1. Functional Configuration>

Figure 6:
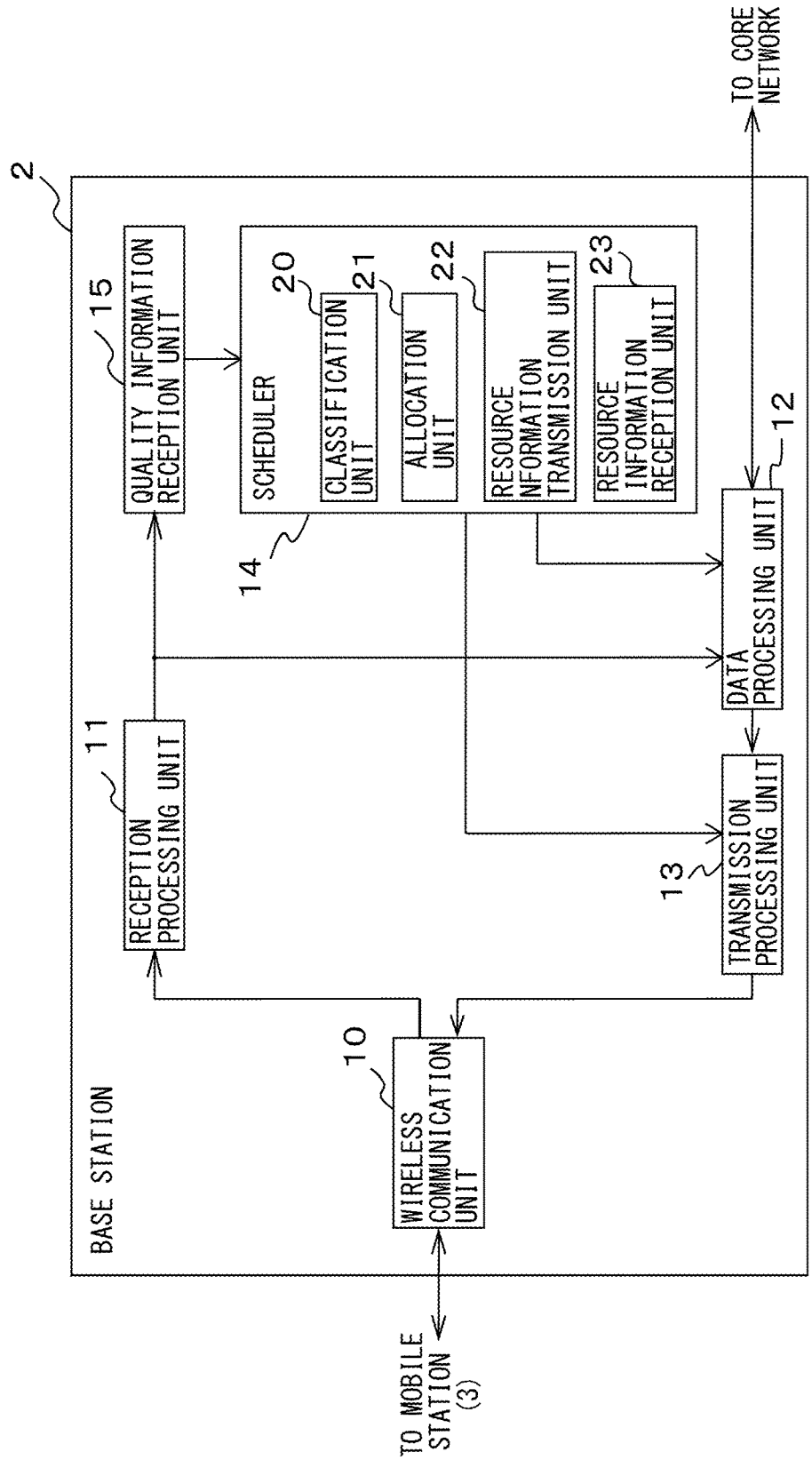
FIG. 6 is a diagram of a functional configuration in a first example of a base station apparatus.

Another embodiment of the communication system 1 will be described. FIG. 6 is a diagram of a functional configuration in the first example of the base station 2 used in the communication system 1. The base station 2 includes a wireless communication unit 10, a reception processing unit 11, a data processing unit 12, a transmission processing unit 13, a scheduler 14 and a quality information reception unit 15.

The wireless communication unit 10 receives a radio signal having a radio bandwidth received by an antenna and converts the received radio signal into a reception signal having a baseband bandwidth. The reception processing unit 11 executes a process of demodulating and decoding the reception signal. The reception signal coming from the mobile station 3 may contain user data and quality information. The quality information is information in the mobile station 3, which represents a reception quality of the transmission signal coming from the base station 2. The quality information may be exemplified such as RSRP (Reference Signal Received Power), RSRQ (Reference Signal Received Quality) and CQI (Channel Quality Indication).

The quality information may be "MeasurementReport" transmitted by a terminal device standardized by, e.g., 3GPP (3rd Generation Partnership Project). The "MeasurementReport" may contain a reception intensity of the signal transmitted from within the cell to which the mobile station 3 connects, a reception intensity of the signal transmitted from within a peripheral cell and identifiers of the respective cells. The reception processing unit 11 outputs the user data to the data processing unit 12, and outputs the quality information to the quality information reception unit 15.

The data processing unit 12 transmits the user data to an upper rank device connected to the core network. The data processing unit 12 receives the user data from the upper rank device. The data processing unit 12 receives, from the scheduler 14, allocation information of the wireless resource of an uplink allocated to the mobile station 3. The data processing unit 12 outputs downlink control information containing the uplink allocation information and the user data as downlink signals to the transmission processing unit 13.

The transmission processing unit 13 receives, from the scheduler 14, the allocation information of the wireless resource of the downlink allocated to the mobile station 3. The transmission processing unit 13 encodes and modulates the downlink signal received from the data processing unit 12. The transmission processing unit 13 generates a baseband signal with a post-modulating downlink signal being mapped to the frequency bandwidth specified by the allocation information, and outputs the baseband signal to the wireless communication unit 10 at a transmission timing specified by the allocation information. The wireless communication unit 10 converts the baseband signal into the signal having the radio bandwidth, and thereafter transmits the converted signal via the antenna.

The quality information reception unit 15 inputs the quality information inputted from the reception processing unit 11 to the scheduler 14. The scheduler 14 determines, based on the quality information, the wireless resources allocated to the downlink communication with the mobile station 3 and to the uplink communication. The scheduler 14 outputs the allocation information of the uplink wireless resource to the data processing unit 12, and outputs the allocation information of the downlink wireless resource to the transmission processing unit 13.

The scheduler 14 includes a classification unit 20, an allocation unit 21, a resource information transmission unit 22 and a resource information reception unit 23. The classification unit 20 classifies, based on the quality information, the mobile station 3 transmitting this quality information into any one of the CoMP mobile station and the non-CoMP mobile station. The CoMP mobile station is defined as the mobile station performing the CoMP communication with the base station 2, and corresponds to the first mobile station described above. The non-CoMP mobile station is classified as the mobile station not performing the CoMP communication with the base station 2, and corresponds to the second mobile station described above.

The classification unit 20 may classify the mobile station 3 transmitting the lower quality information than, e.g., a determination threshold value as the CoMP mobile station, and may classify the mobile station 3 transmitting the quality information equal to or higher the determination threshold value as the non-CoMP mobile station. Further, for instance, the classification unit 20 may classify the mobile station 3 with an intensity of the reception power from another cell being larger than the determination threshold value as the CoMP mobile station, and may classify the mobile station 3 with the intensity of the reception power from another cell being equal to or smaller than the determination threshold value as the non-CoMP mobile station.

The allocation unit 21 performs scheduling for the CoMP mobile station. To be specific, the allocation unit 21 allocates the wireless resource to the CoMP mobile station. The allocation unit 21 outputs, to the resource information transmission unit 22, resource information for specifying the wireless resource allocated to the CoMP mobile station. For example, the resource information may be information for specifying a frequency resource allocated to the CoMP mobile station. The allocation unit 21 is one example of a first allocation unit and a second allocation unit.

The resource information transmission unit 22 transmits the resource information received from the allocation unit 21 to another base station 2 belonging to the same cluster via the cable connection 5 between the base stations. For instance, the resource information transmission unit 22 of the base station 2a notifies the base stations 2b, 2c of the resource information, and the resource information transmission unit 22 of the base station 2b notifies the base stations 2a, 2c of the resource information. Moreover, the resource information transmission unit 22 of the base station 2c notifies the base stations 2a, 2b of the resource information.

The resource information reception unit 23 receives the resource information transmitted from another base station 2. The allocation unit 21 performs scheduling for the non-CoMP mobile station after scheduling for the CoMP mobile station. The allocation unit 21 may perform scheduling for the non-CoMP mobile station later than reception scheduled timing scheduled to receive the resource information transmitted from another base station 2.

The allocation unit 21 performs scheduling the wireless resource allocated to the non-CoMP mobile station in another cell to reduce the interference with the wireless resource allocated to the CoMP mobile station in a certain cell. For example, the allocation unit 21 performs scheduling the wireless resource allocated to the non-CoMP mobile station to reduce the interference with the wireless resource allocated from another base station 2 to the CoMP mobile station.

For example, the allocation unit 21 does not allocate, to the non-CoMP mobile station in another cell, the same wireless resource as the wireless resource allocated to the CoMP mobile station in a certain cell. For instance, the allocation unit 21 does not allocate, to the non-CoMP mobile station, the same wireless resource as the wireless resource allocated from another base station 2 to the CoMP mobile station. With this contrivance, as far as the plurality of base stations 2 does not allocate the same wireless resource to the CoMP mobile station, another base station 2 is made to stop outputting the signal in the same frequency bandwidth at the same timing as the timing at which a certain base station 2 transmits the signal to the CoMP mobile station. Consequently, the interference with the CoMP mobile station is reduced.

In another embodiment, the scheduler 14 may adjust the beam direction of the transmission radio waves so that the output of the signal having the frequency bandwidth allocated from another base station 2 to the CoMP mobile station decreases toward another base station 2.

Figure 7:
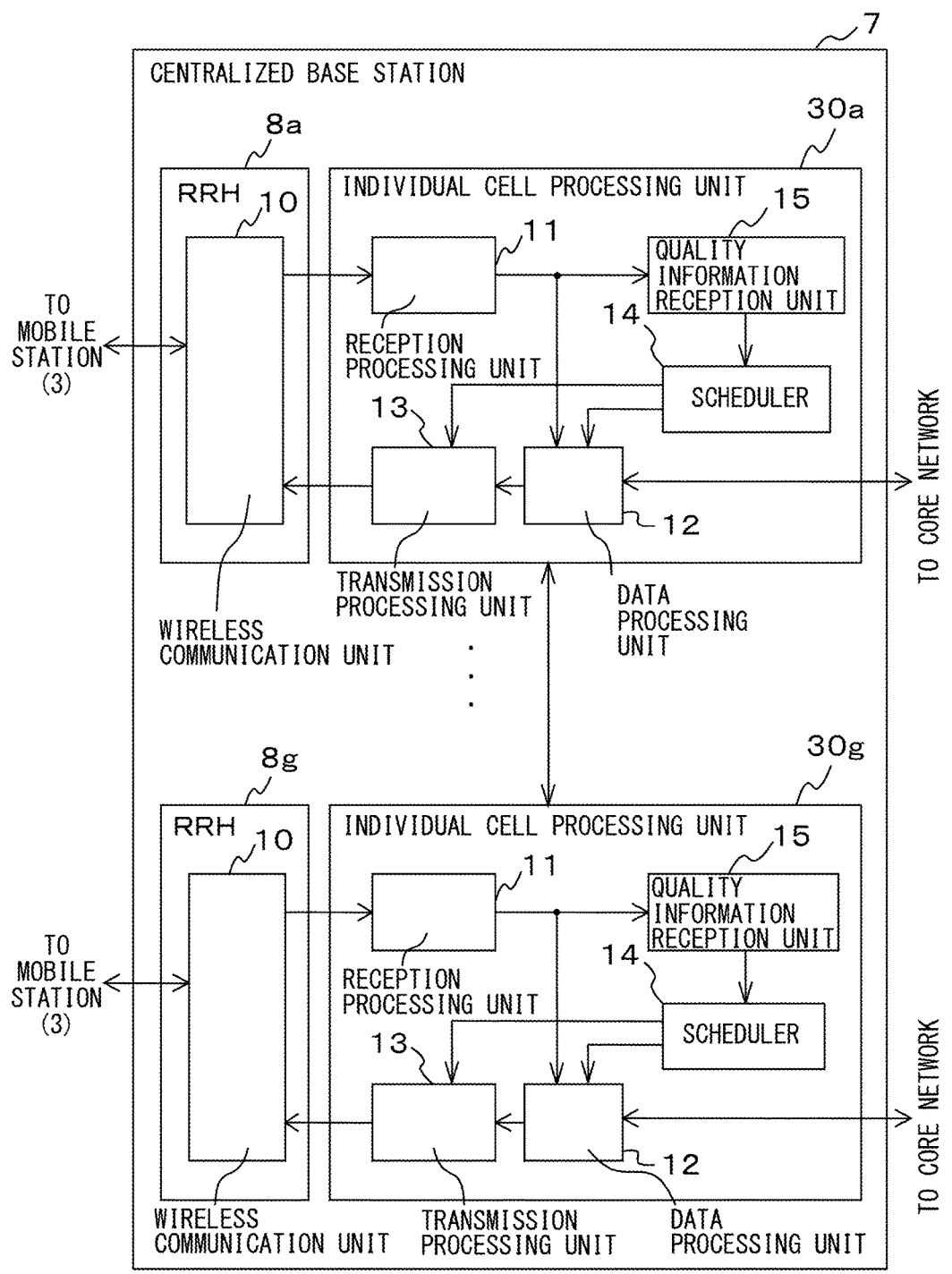
FIG. 7 is a diagram of a functional configuration in a modified example of the base station apparatus.

FIG. 7 illustrates one example of functional configurations of the centralized base station 7 and the RRHs 8a-8g in the configuration of FIG. 3. The function of the centralized base station 7 may be divided into individual cell processing units 30a-30g each executing a process on a cell-by-cell basis with respect to the cells 4a-4g. Each of the individual cell processing units 30a-30g may include the same functional components as those of the reception processing unit 11, the data processing unit 12, the transmission processing unit 13, the scheduler 14 and the quality information reception unit 15 of the base station 2 depicted in FIG. 6. Further, the wireless communication units 10 of the base stations 2 illustrated in FIG. 6 are provided on the side of the RRHs 8a-8g.

Figure 8:
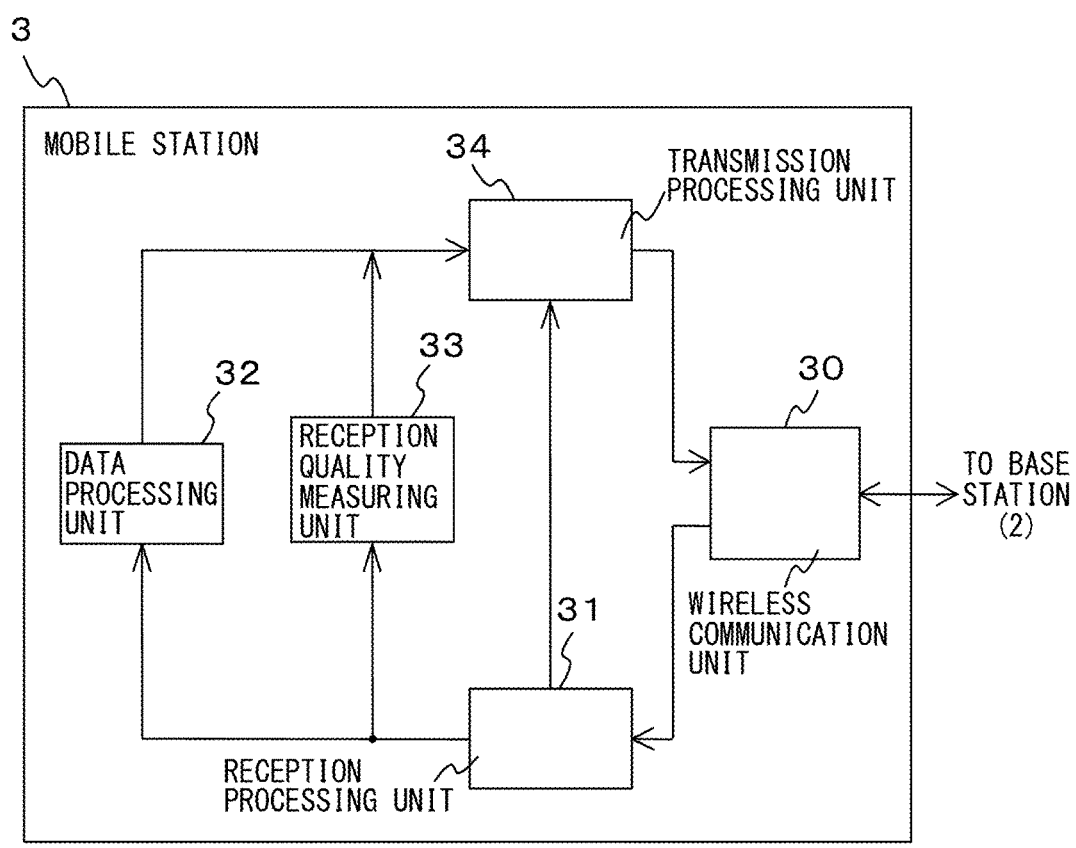
FIG. 8 is a diagram of a functional configuration in a first example of the mobile station apparatus.

FIG. 8 is diagram of a functional configuration in the first example of the mobile station 3. The mobile station 3 includes, a wireless communication unit 30, a reception processing unit 31, a data processing unit 32, a reception quality measuring unit 33 and a transmission processing unit 34. The wireless communication unit 30 receives the radio signal having the radio bandwidth received by the antenna, and converts the radio signal into a reception signal having a baseband bandwidth.

The reception processing unit 31 executes a process of demodulating and decoding the reception signal. The reception signal coming from the base station 2 may contain the user data and a downlink control signal. The reception processing unit 31 outputs the user data to the data processing unit 32, and outputs the downlink control signal to the transmission processing unit 34.

The data processing unit 32 conducts a process on a high-order layer such as an application layer for the user data received from the reception processing unit 31. Further, the data processing unit 32 outputs the uplink user data generated by the process on the high-order layer to the transmission processing unit 34.

The reception quality measuring unit 33 measures a reception quality of the mobile station 3 when the mobile station 3 receives the transmission signal from the base station 2. The reception quality measuring unit 33 generates the quality information indicating a result of the measurement, and outputs the generated quality information to the transmission processing unit 34. As described above, the quality information may be exemplified such as RSRP, RSRQ, CQI and Measurement Report.

The transmission processing unit 34 acquires, from the downlink control signal, the allocation information of the uplink wireless resource allocated to the mobile station 3. The transmission processing unit 34 encodes and modulates the user data and the quality information received respectively from the data processing unit 32 and the reception quality measuring unit 33 as the uplink signals. The transmission processing unit 34 generates the baseband signal with the post-modulating uplink signal being mapped to the frequency bandwidth of the wireless resource specified by the allocation information, and outputs the baseband signal to the wireless communication unit 10 at the transmission timing specified by the allocation information. The wireless communication unit 30 converts the baseband signal into the signal having the radio bandwidth, and thereafter transmits the converted signal via the antenna.

<2.2. Operation>

Figure 9:
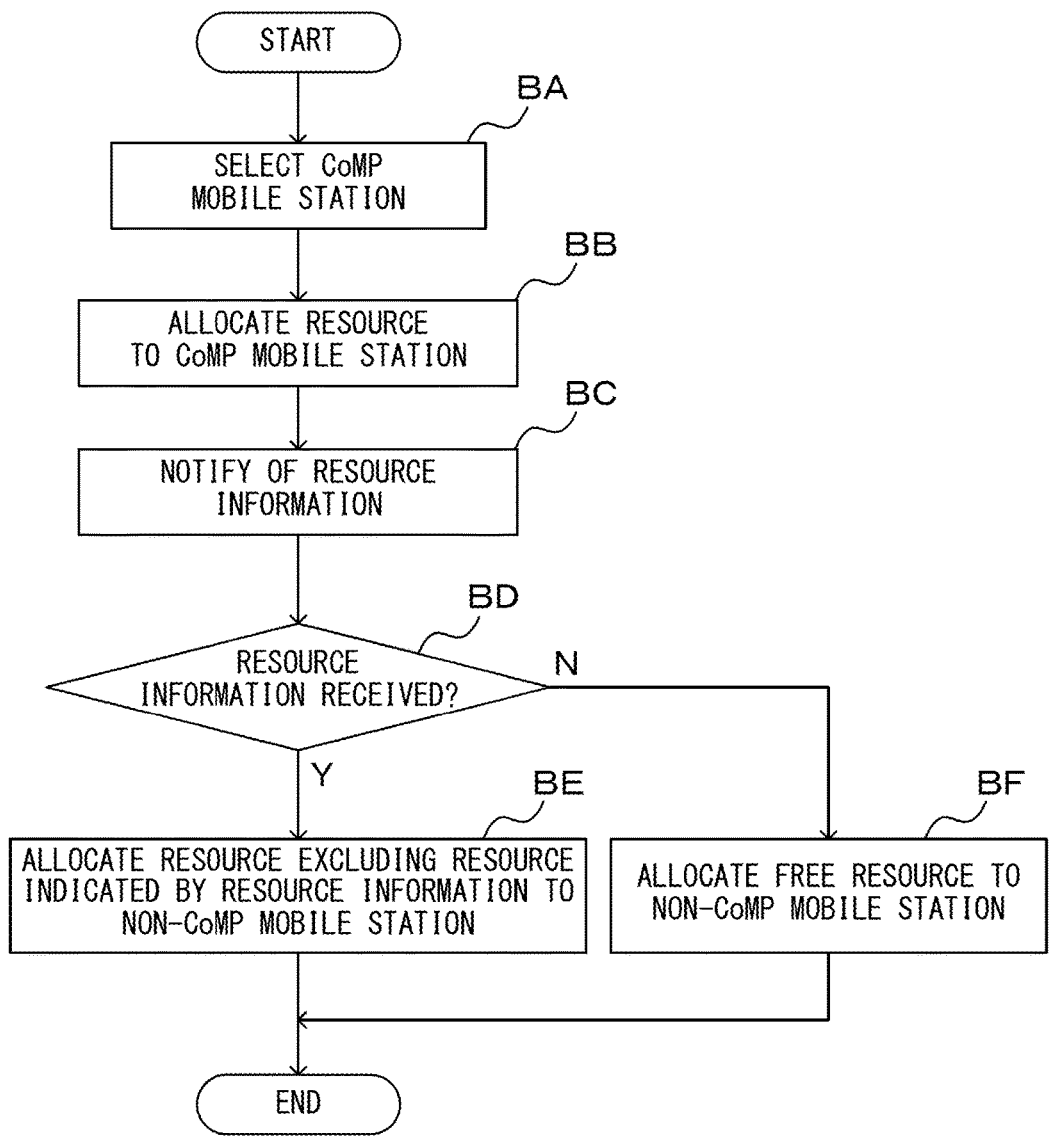
FIG. 9 is an explanatory flowchart in a first example of an operation of the base station apparatus.

FIG. 9 is an explanatory flowchart in the first example of the operation of the base station 2. The operation in FIG. 9 is periodically executed at a predetermined execution interval such as a scheduling period given by the scheduler 14. In an operation BA, the classification unit 20 selects the CoMP mobile station from within the mobile stations 3 on the basis of the quality information received from the respective mobile stations 3 being connected to the base station 2. The mobile stations 3 not being selected are designated as the non-CoMP mobile stations.

In an operation BB, the allocation unit 21 allocates the wireless resource to the CoMP mobile station. In an operation BC, the resource information transmission unit 22 transmits, to another base station 2, the resource information indicating the wireless resource allocated to the CoMP mobile station. Further, the resource information reception unit 23 receives the resource information transmitted from another base station 2.

In an operation BD, the allocation unit 21 determines whether the resource information is received from another base station 2 or not. When the resource information is received (operation BD: Y), the processing advances to an operation BE. When the resource information is not received (operation BD: N), the processing diverts to an operation BF.

In the operation BE, the allocation unit 21 allocates the wireless resource to the non-CoMP mobile station. At this time, the allocation unit 21 allocates, to the non-CoMP mobile station, a resource other than the wireless resource specified by the resource information received from another base station 2. Thereafter, the base station 2 stands by or halts until a next event trigger for the execution is reached.

In an operation BF, the allocation unit 21 allocates, to the non-CoMP mobile station, any one of free resources defined as the resources other than the resources allocated in the operation BC. Thereafter, the base station 2 stands by or halts till the next event trigger for the execution is reached.

Figure 10:
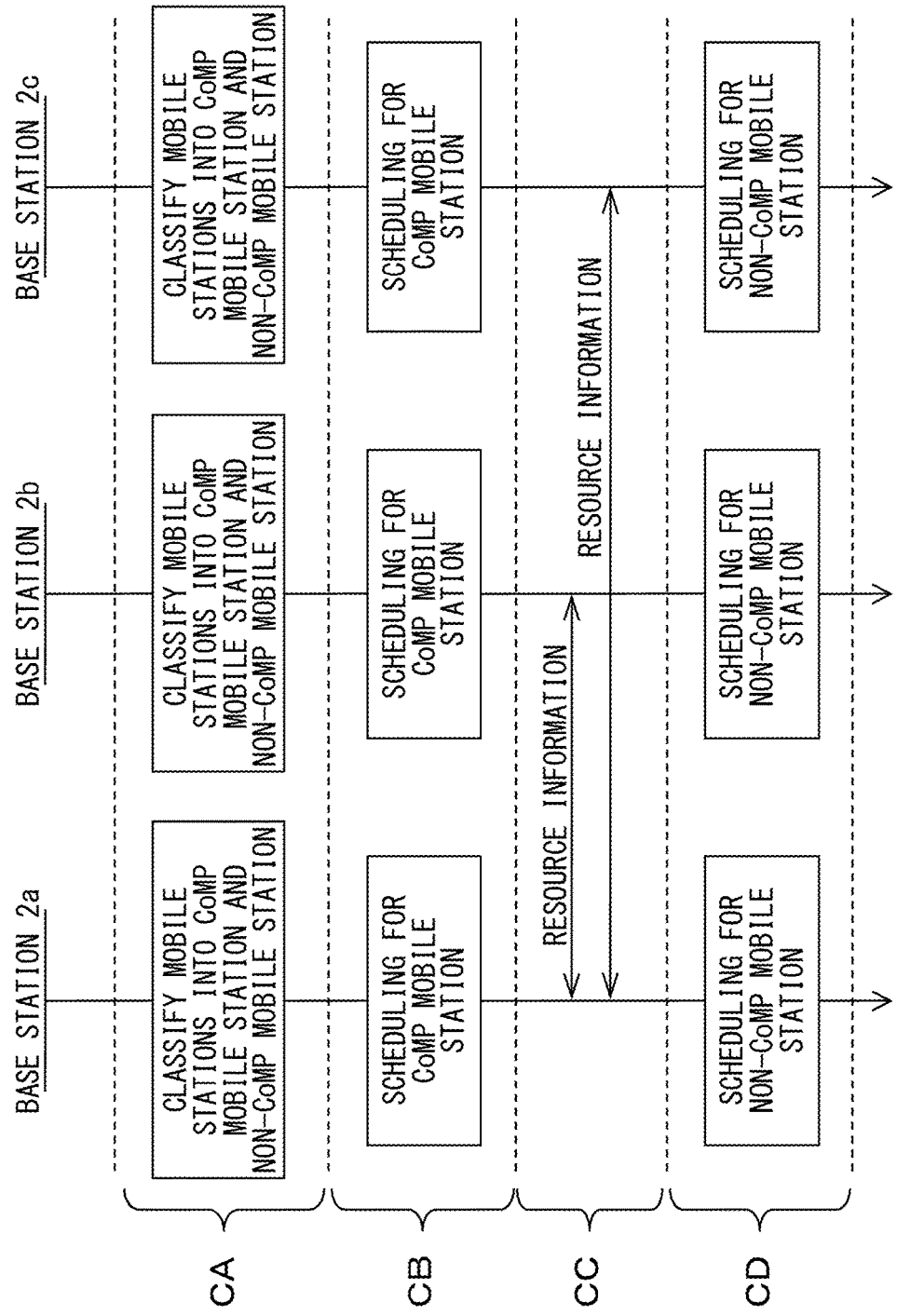
FIG. 10 is a diagram illustrating a first example of a processing sequence of the communication system.

FIG. 10 is a diagram illustrating a first example of a processing sequence of the communication system. The processing sequence is executed at a predetermined execution interval such as the scheduling period given by the base station 2. In an operation CA, the base stations 2a-2c classify the mobile stations 3 connected thereto into the CoMP mobile stations and the non-CoMP mobile stations. The operation CA corresponds to the process of the classification unit 20.

In an operation CB, the base stations 2a-2c perform scheduling with respect to the CoMP mobile stations connected thereto. The operation CB corresponds to the process of the allocation unit 21. In an operation CC, the base stations 2a-2c replace the resource information of the wireless resources allocated respectively to the CoMP mobile stations. The operation CC corresponds to the process of the resource information transmission unit 22 and the process of the resource information reception unit 23.

In an operation CD, each of the base stations 2a-2c performs scheduling with respect to the non-CoMP mobile station to reduce the interference with the wireless resource specified by the resource information received from another base station 2. The operation CD corresponds to the process of the allocation unit 21. Thereafter, the base stations 2a-2c stand by or halt till the next event trigger for the execution is reached.

<2.3. Effect>

According to the second embodiment, the mobile stations 3 can be classified into the CoMP mobile stations and the non-CoMP mobile stations on the basis of the reception quality measured in the mobile stations 3. The actual radio waves largely vary depending on factors other than a relative positional relationship between the base station and the mobile station. It is therefore feasible to select a more proper mobile station as the CoMP mobile station on the basis of the reception quality.

<2.4. Modified Example>

The second embodiment discussed above has provided the example of implementing the CoMP utilizing the method (Coordinated Scheduling) based on the reduction of the interference, however, the second embodiment may be modified to implement the CoMP utilizing a method (Joint Transmission) contrived to improve the signal power in the same data transmission in the plurality of cells. The same modification may be applied to the first embodiment and to third through sixth embodiments that will be described later on.

In this modified example, the base station 2 transmits the data to be transmitted to the CoMP mobile station to another base station 2. For example, the data to be transmitted to the CoMP mobile station is transmitted together with the resource information to another base station 2. Another base station transmits the data to be transmitted to the CoMP mobile station in another cell through the wireless resource specified by the resource information.

Figure 11:
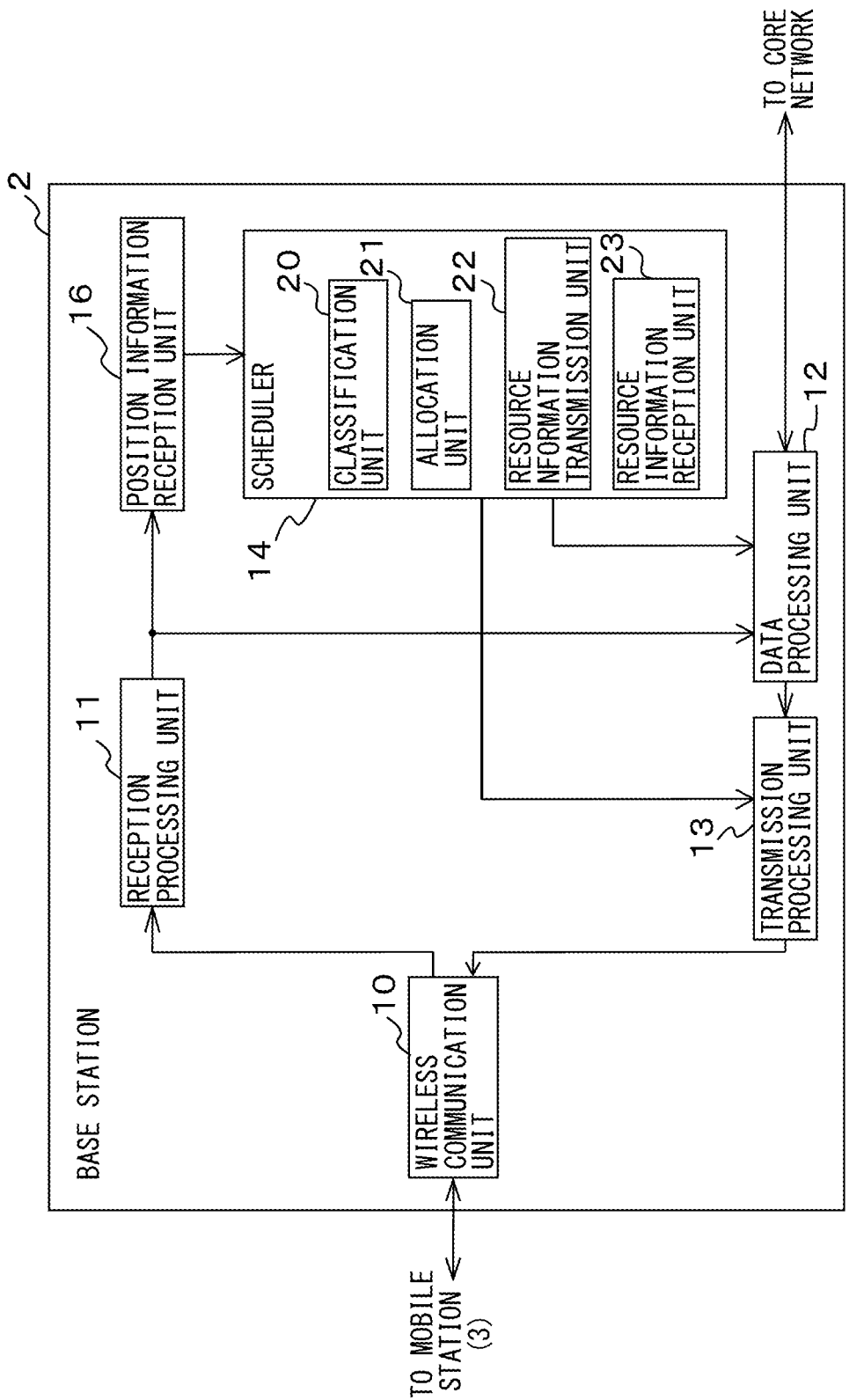
FIG. 11 is a diagram of a functional configuration in a modified example of the base station apparatus.
Figure 12:
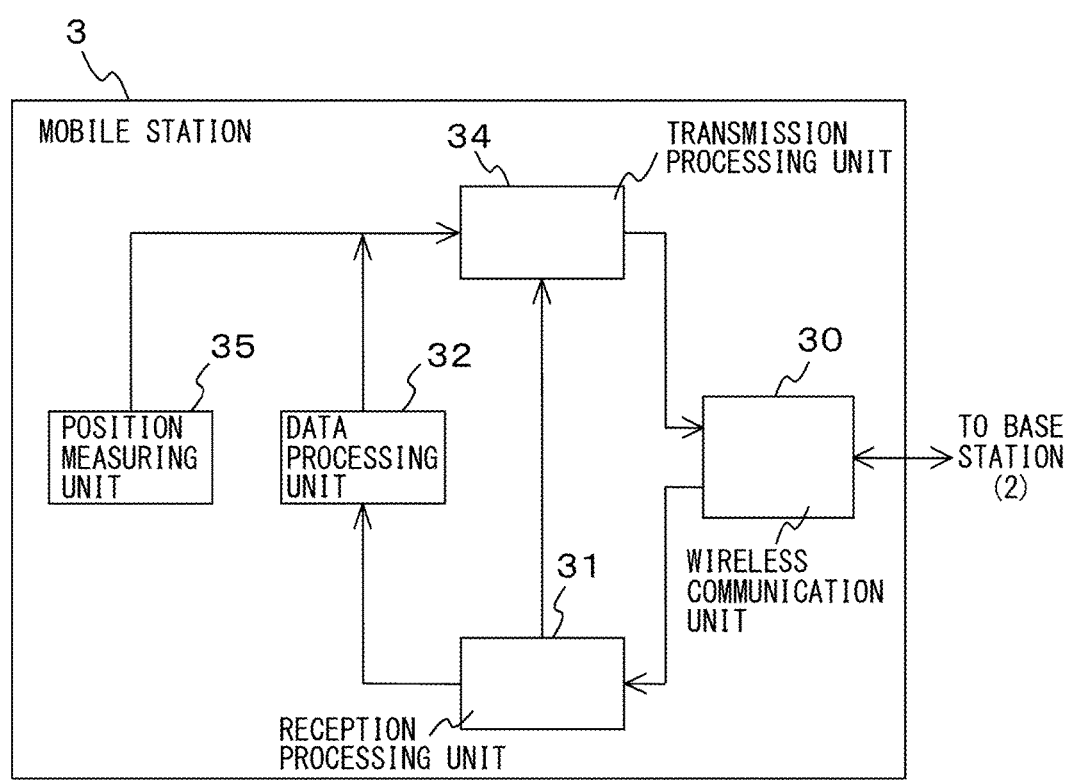
FIG. 12 is a diagram of a functional configuration in a modified example of the mobile station apparatus.

Further, in still another embodiment, the mobile stations 3 may be classified into the CoMP mobile stations and the non-CoMP mobile stations on the basis of distances between the base station 2 and the mobile stations 3. FIGS. 11 and 12 are diagrams of functional configurations in modified examples of the base station 2 and the mobile station 3. The same components as those illustrated in FIGS. 6 and 8 are marked with the same reference numerals and symbols as those used in FIGS. 6 and 8, and the descriptions of the same functions are omitted.

The base station 2 includes a position information reception unit 16 that receives position information of the mobile station 3, the information being transmitted from the mobile station 3. The position information reception unit 16 outputs the position information to the scheduler 14. The classification unit 20 classifies the mobile station 3 transmitting the position information into any one of the CoMP mobile station and the non-CoMP mobile station on the basis of a distance between the position, indicated by the position information, of the mobile station 3 and a known position of the base station 2. For example, the classification unit 20 may classify the mobile station 3 of which the distance from the base station 2 is larger than a determination threshold value as the CoMP mobile station, and may classify the mobile station 3 of which the distance from the base station 2 is equal to or smaller than the determination threshold value as the non-CoMP mobile station.

The mobile station 3 includes a positioning unit 35. The positioning unit 35 measures the position of the mobile station 3 by use of a known method of measuring the position in a way that utilizes reception radio waves transmitted from GPS (Global Positioning System) and from a peripheral base station apparatus. The positioning unit 35 generates the position information of the mobile station 3 and outputs the generated information to the transmission processing unit 34. The transmission processing unit 34 encodes and modulates the position information, then generates the baseband signal of the modulated signal, and transmits the generated signal as the signal having the radio bandwidth via the wireless communication unit 30.

In still another embodiment, the mobile stations 3 may be classified into the CoMP mobile station and the non-CoMP mobile station on the basis of a propagation loss from the base station 2 to the mobile station 3. For example, the base station 2 having the configuration illustrated in FIG. 6 receives the RSRP as the quality information. The classification unit 20 calculates the propagation loss from the base station 2 to the mobile station 3 in accordance with a difference between a known transmission intensity of a reference signal transmitted from the base station 2 and a reception intensity indicated by the RSRP.

The classification unit 20 classifies the mobile station 3 transmitting the RSRP into any one of the CoMP mobile station and the non-CoMP mobile station on the basis of the calculated propagation loss. For instance, the classification unit 20 may classify the mobile station 3 with the propagation loss being larger than a determination threshold value into the CoMP mobile station, and may classify the mobile station 3 with the propagation loss being equal to or smaller than the determination threshold value into the non-CoMP mobile station.

<3. Third Embodiment>

The interference, exerted from another cell, with the CoMP mobile station is reduced by implementing the CoMP, or alternatively the reception intensity in the CoMP mobile station augments, whereby an improvement of the reception quality in the CoMP mobile station, particularly, an improvement of the SINR, is expected. A third embodiment involves predicting the reception quality in the CoMP mobile station on the occasion of implementing the CoMP, and scheduling the wireless resources allocated to the mobile stations 3 on the basis of the predicted reception quality.

Figure 13:
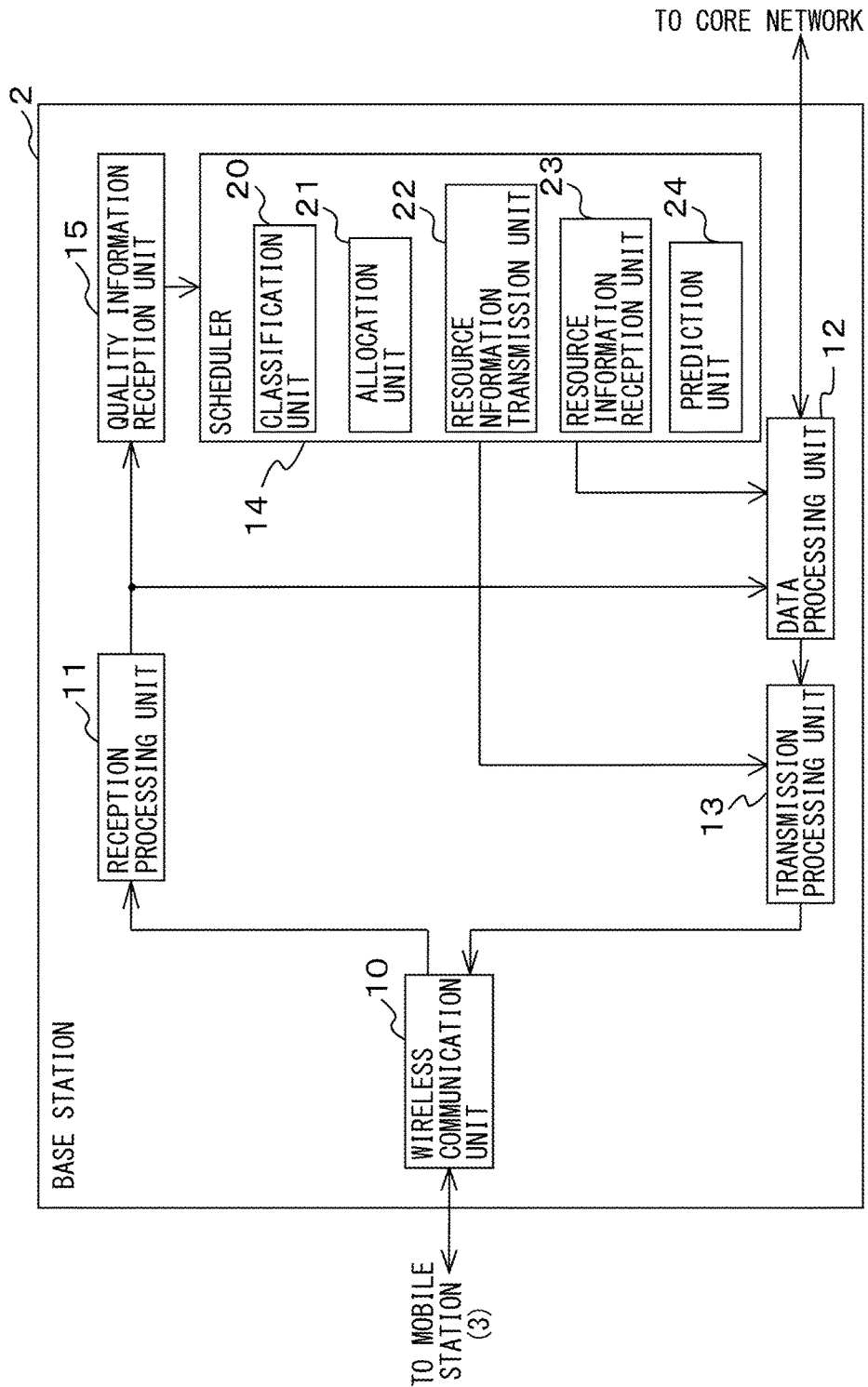
FIG. 13 is a diagram of the functional configuration in a second example of the base station apparatus.

FIG. 13 is a diagram of a functional configuration in a second example of the base station 2. The same components as those illustrated in FIG. 6 are marked with the same reference numerals and symbols as those used in FIG. 6, and the descriptions of the same functions are omitted. The scheduler 14 includes a prediction unit 24 that predicts the reception quality of the CoMP mobile station on the occasion of implementing the CoMP.

The prediction unit 24 may predict, as the reception quality on the occasion of implementing the CoMP, a reception quality in the CoMP mobile station when the interference disappears, the interference being exerted from another cell belonging to the same cluster as the cluster to which the cell receiving the connection of the CoMP mobile station belongs. For example, the prediction unit 24 acquires, from the MeasurementReport, the reception intensities given from the base station 2 and from the peripheral cell. The prediction unit 24 assumes that the reception intensity from another cell belonging to the same cluster as the cluster to which the cell receiving the connection of the CoMP mobile station belongs becomes zero, and estimates an interference signal intensity from only the reception intensities of the remaining peripheral cells. The prediction unit 24 predicts the reception quality of the CoMP mobile station on the occasion of implementing the CoMP on the basis of the estimated interference signal intensity and the signal intensity in the cell receiving the connection of the CoMP mobile station.

The allocation unit 21 performs scheduling with respect to the CoMP mobile station on the basis of a result of the prediction made by the prediction unit 24. Proportional Fairness Scheduling is given by way of one example of the scheduling based on the reception quality. The Proportional Fairness Scheduling prioritizes the mobile station exhibiting a larger ratio of the instantaneous reception quality to a timewise average value of the reception qualities. The allocation unit 21 may perform various types of scheduling such as scheduling to prioritize the mobile station exhibiting a higher reception quality and scheduling to prioritize the mobile station exhibiting a lower reception quality.

The third embodiment enables the improvement of the reception quality of the CoMP mobile station to be reflected in scheduling, the improvement being expected from implementing the CoMP even when executing the scheduling process involving the CoMP on the cell-by-cell basis. A more proper scheduling is therefore attainable.

<4. Fourth Embodiment>

In the operation BB illustrated in FIG. 9, such a possibility exists that the same wireless resource is allocated to the CoMP mobile stations connected to the plurality of cells belonging to the same cluster. In this case, the wireless resources allocated in another cell are disabled from being avoided as in the operation BE, there is an undesirable possibility that a conflict occurs between or among the wireless resources used for transmitting the signals to the CoMP mobile stations in the plurality of cells.

The fourth embodiment is contrived to allocate the wireless resources being allocable to the CoMP mobile stations to between the plural cells belonging to the same cluster. Specifically, the wireless resource usable for the communication between the base station 2 and the mobile station 3 is segmented so as not to be overlapped, and plural segmented wireless resources are allocated to the different cells as the wireless resources being allocable to the CoMP mobile stations. The allocation unit 21 selects the wireless resource to be allocated to the CoMP mobile station connected to a certain cell from within the wireless resources allocated to this cell as the wireless resources being allocable to the CoMP mobile stations.

For example, the frequency bandwidth usable for the communication between the base station 2 and the mobile station 3 may be segmented into three bandwidths F1, F2 and F3. The bandwidths F1, F2 and F3 are allocated to cells 4a, 4b and 4c. The base stations 2a, 2b and 2c configuring the cells 4a, 4b and 4c select the frequency resources to be allocated to the CoMP mobile stations from only the bandwidths F1, F2 and F3, thereby enabling avoidance of the conflict between the wireless resources used for transmitting the signals to the CoMP mobile stations.

<5. Fifth Embodiment>

A degree of the interference with the mobile station 3 affects the positional relationship between the cell 4 and the mobile station 3. Therefore, e.g., even when the mobile station 3c is designated as the CoMP mobile station because of the cell 4b exerting the intensive interference on the mobile station 3c connected to the cell 4a, the interference from the cell 4c is weak as the case may be. In such a case, there is a small necessity for restricting the cell 4c to utilize the wireless resource allocated to the mobile station 3c.

This being the situation, in the fifth embodiment, the base station 2 transmits the resource information more preferentially to the base station 2 configuring the cell exerting the more intensive interference on the CoMP mobile station. For example, the base station 2 transmits the resource information to only the base station 2 configuring the cell exerting the interference being larger than the determination threshold value on the CoMP mobile station.

For instance, in each of the base stations 2 having the configurations in FIGS. 6 and 13, the resource information transmission unit 22 acquires, from the MeasurementReport received from the CoMP mobile station, the reception intensity from another cell belonging to the same cluster as the cluster to which the cell receiving the connection of the CoMP mobile station belongs. The resource information transmission unit 22 transmits the resource information to only the base station 2 configuring the cell in which to transmit the signal received with the intensity being larger than the determination threshold value.

For example, in the base station 2 having the configuration in FIG. 11, the resource information transmission unit 22 calculates, based on the position information received from the CoMP mobile station, a distance between the CoMP mobile station and the base station in another cell belonging to the same cluster as the cluster to which the cell receiving the connection of the CoMP mobile station belongs. The resource information transmission unit 22 transmits the resource information to only the base station 2 of which a distance from the CoMP mobile station is smaller than the determination threshold value.

According to the fifth embodiment, the cell exhibiting a small degree of interference with the CoMP mobile station has a decreased opportunity to restrict the use of the wireless resource allocated to the CoMP mobile station. Hence, usage efficiency of the wireless resource is improved. Further, a transmission quantity of the resource information transmitted via the cable connection 5 is reduced due to a decreased number of destinations to which the resource information is transmitted. Accordingly, a load on the network between the base stations is reduced, the network being configured by use of the cable connection 5.

<6. Sixth Embodiment>

As described above, the resource information for specifying the wireless resource allocated to the CoMP mobile station is transmitted via the cable connection 5 between the base stations. Therefore, a transmission delay occurs in transmitting the resource information between the base stations 2 in some cases.

Figure 14:
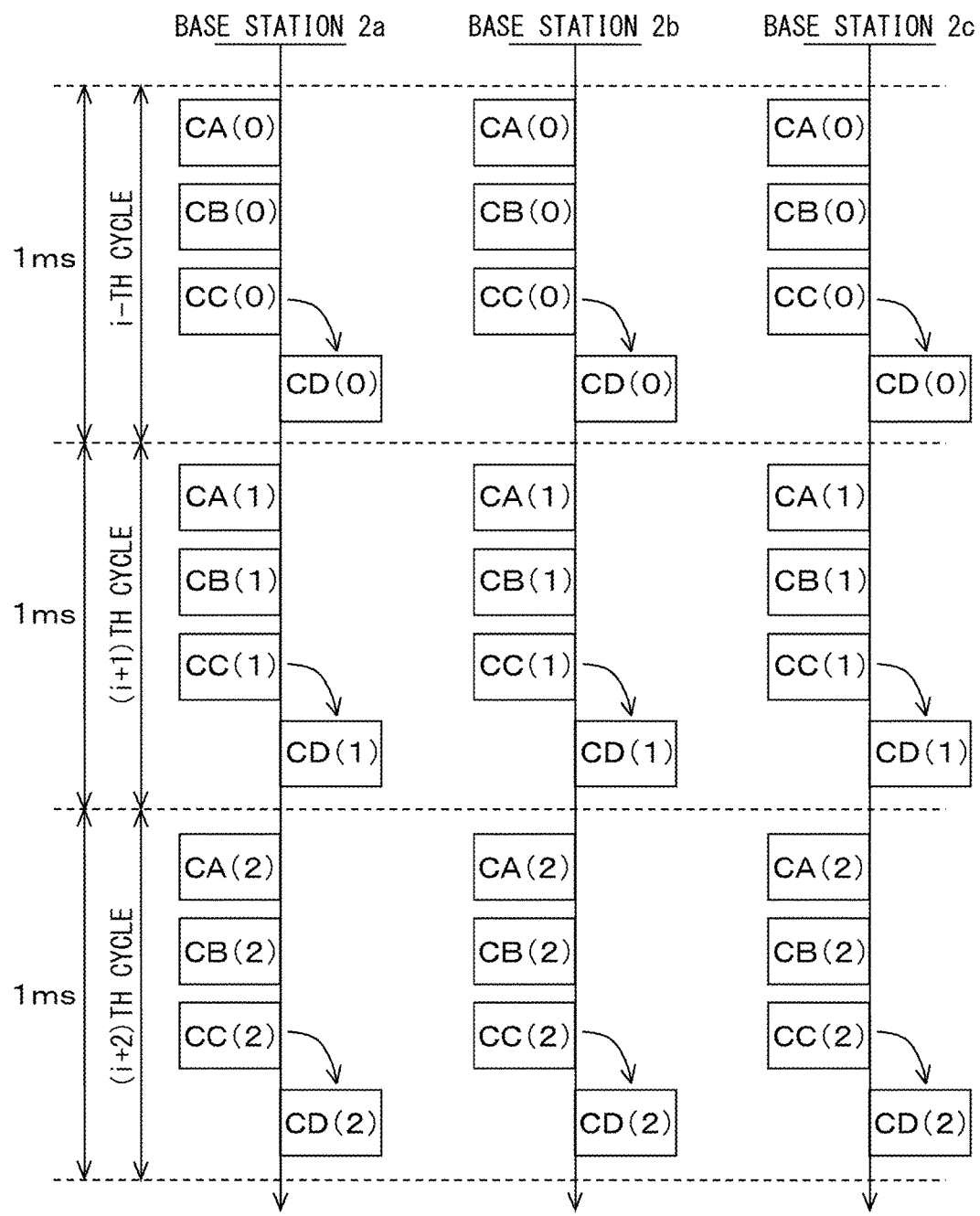
FIG. 14 is a diagram illustrating one example of the processing sequence of the communication system when a transmission loss is small.

FIG. 14 is a diagram illustrating one example of the processing sequence of the communication system 1 when the transmission delay is small. It is assumed that the scheduling period of the wireless resource by the scheduler 14 is "1 ms". Reference symbols CA(0), CA(1) and CA(2) represent the same processes as those of the operation CA of the processing sequence in FIG. 10. Reference symbols CB(0), CB(1) and CB(2) represent the same processes as those of the operation CB of the processing sequence in FIG. 10. Reference symbols CC(0), CC(1) and CC(2) represent the same processes as those of the operation CC of the processing sequence in FIG. 10. Reference symbols CD(0), CD(1) and CD(2) represent the same processes as those of the operation CD of the processing sequence in FIG. 10. Numerals [0], [1] and [2] enclosed by the reference symbols, i.e., brackets represent the processes at i-th, (i+1)th and (i+2)th scheduling cycles, respectively. The same notation is applied to FIGS. 15 and 16.

Note that the symbols CA(0), CA(1) and CA(2) may be generically termed [CA] in the following discussion. The symbols CB(0), CB(1) and CB(2) may be generically termed [CB]. The symbols CC(0), CC(1) and CC(2) may be generically termed [CC]. The symbols CD(0), CD(1) and CD(2) may be generically termed [CD].

As depicted in FIG. 14, when the propagation delay, occurring in the operation CC, of the resource information via the cable connection 5 is comparatively small, the operations CA, CB, CC and CD can be completed within one scheduling period.

Figure 15:
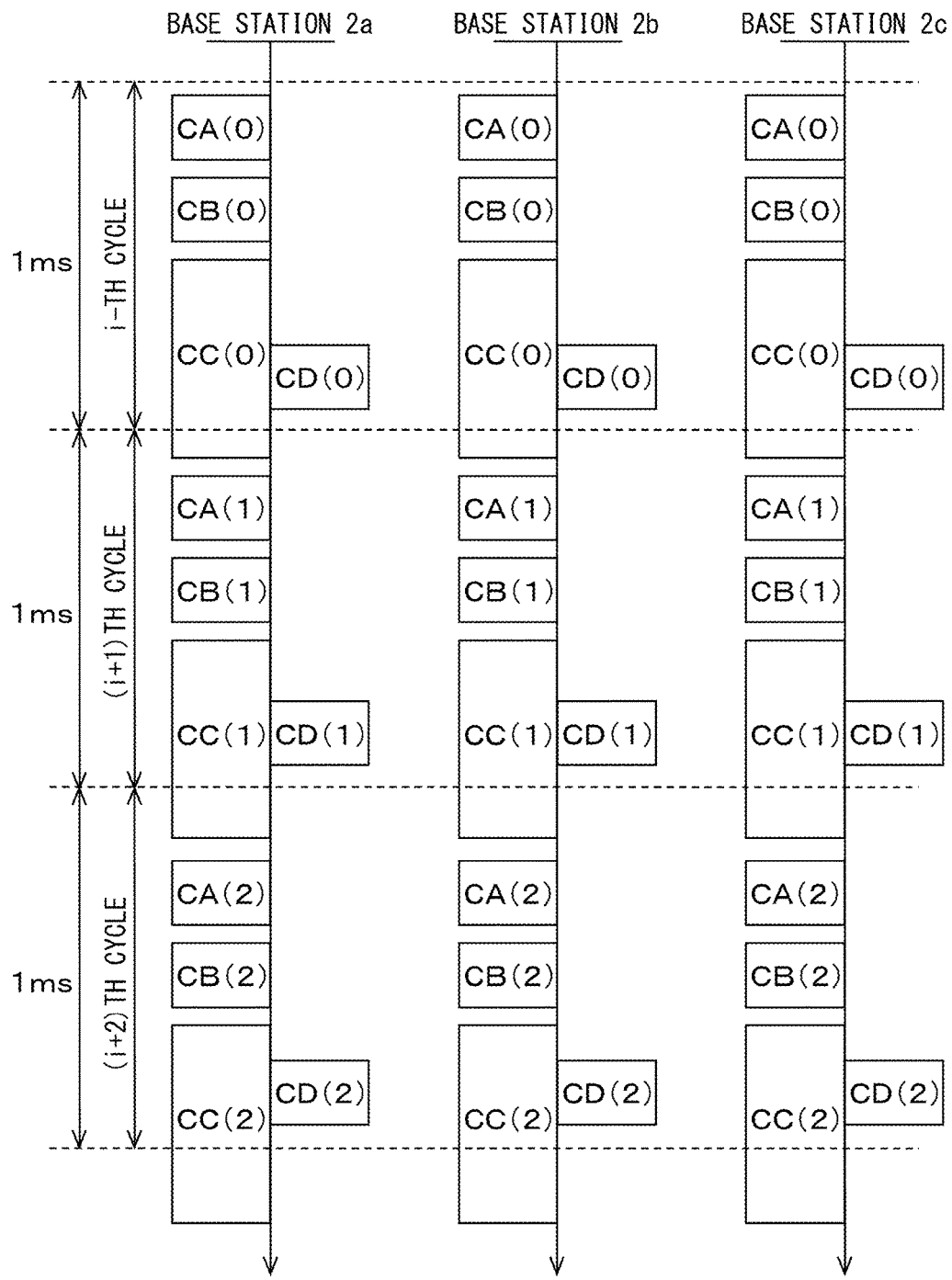
FIG. 15 is a diagram illustrating one example of the processing sequence of the communication system when the transmission loss is large.

FIG. 15 is a diagram illustrating one example of the processing sequence of the communication system 1 when the transmission delay is large. When the transmission delay occurring in the operation CC is comparatively large, the operations CA, CB, CC and CD are disabled from being completed within the single scheduling cycle. For instance, the transmission delay of an X2 interface for establishing the connection between the base stations in LTE (Long Term Evolution) specified by 3GPP spans several tens of milliseconds (ms) in some cases, which is longer than the scheduling period on the order of "1 ms". As a result, the transmission of the resource information of the CoMP mobile station in the operation CC does not catch up with the scheduling of the non-CoMP mobile station in the operation CD.

Such being the case, a contrivance in the sixth embodiment is that the non-CoMP mobile station undergoes scheduling by use of the resource information of the CoMP mobile station subjected to scheduling at the cycle earlier than the scheduling cycle to perform scheduling of the non-CoMP mobile station.

For instance, as illustrated in FIG. 16, the scheduler 14 operates so that the period of executing the operations CA-CC becomes longer than the period of executing the operation CD. Note that the period of executing the operation CD may be the same as the scheduling period of the wireless resource by the scheduler 14. In the example of FIG. 16, the the period of executing the operations CA-CC is "2 ms", and the the period of executing the operation CD is "1 ms".

For example, the period of executing the operations CA-CC may be set to a period being longer than an elapse period ranging from a start down to completion of the operations CA-CC. This period being thus set, the scheduler 14 may not be configured to execute the parallel processing of the operations CA-CC.

In the example of FIG. 16, the period of executing the operation CD corresponds to a period from an i-th cycle to an (i+2)th cycle, in which the operation CD is conducted at the i-th cycle through the (i+2)th cycle, respectively. Further, the operations CA and CB are carried out at the i-th cycle and the (i+2)th cycle. The operation CC starting at the i-th cycle finishes at the (i+1)th cycle, and the operation CC starting at the (i+2)th cycle finishes at the (i+3)th cycle. Accordingly, the resource information is received at the (i+1)th cycle and the (i+3)th cycle but is not received at the (i+2)th cycle.

The allocation unit 21 of the scheduler 14 in any one of the embodiments, when not receiving the resource information at the cycle of executing the operation CD, performs scheduling of the non-COMP mobile station by using the resource information received before.

The allocation unit 21 in another embodiment, when not receiving the resource information at the cycle of executing the operation CD, performs scheduling of the non-COMP mobile station at every execution cycle by employing the resource information received at the predetermined previous execution cycle. In the example of FIG. 16, the (i+1)th cycle being one before the (i+2)th cycle is designated at the (i+2)th cycle as the execution cycle of receiving the resource information.

The sixth embodiment may be combined with the first through fifth embodiments discussed above. Moreover, the base station in the sixth embodiment may have any one of the configurations illustrated in FIGS. 6, 7, 11 and 13.

FIG. 17 is an explanatory flowchart in a second example of the operation of the base station apparatus. An operation (processes) in FIG. 17 is periodically executed at the predetermined execution interval such as the scheduling period given by the base station 2. For example, the operation in FIG. 17 may be executed in the scheduling period to determine the wireless resource of the non-COMP mobile station.

In an operation DA, the scheduler 14 determines whether the present timing is the scheduling timing of the CoMP mobile station not. When determined to be the scheduling timing of the CoMP mobile station (operation DA: Y), the processing advances to an operation DB. Whereas when not the scheduling timing of the CoMP mobile station (operation DA: Y), the processing diverts to an operation DE.

The processes in the operations DB-DD are the same as the processes in the operations BA-BC. The allocation unit 21 in the operation DE determines whether or not the resource information is received at the execution cycle being active at the present or at the predetermined previous execution cycle with respect to the execution cycle being active at the present. When the resource information is received (operation DE: Y), the processing advances to an operation DF. Whereas when the resource information is not received (operation DE: Y), the processing diverts to an operation DG.

The processes in the operations DF and DG are the same as those in the operations BE and BF in FIG. 9. After the operations DF and DG, the base station 2 stands by or halts till the next event trigger for the execution is reached.

The sixth embodiment enables the scheduling of the non-CoMP mobile station to be performed by use of the resource information of the CoMP mobile station, which is allocated by another base station 2, even when the transmission delay occurs in an inter-base-station line for transmitting the resource information.

<8. Hardware Architecture>

Figure 18A:
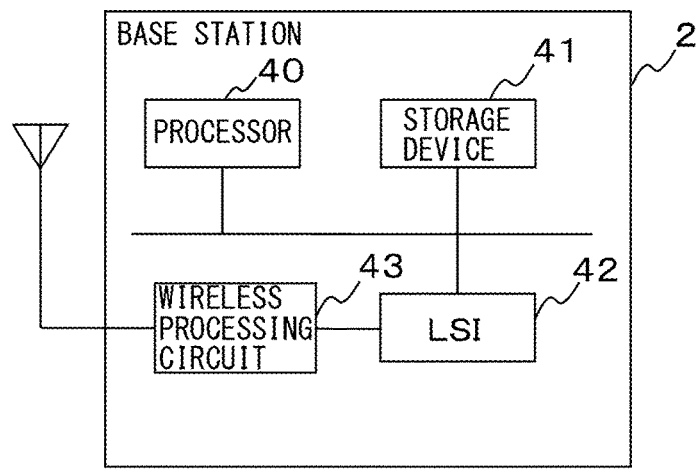
FIGS. 18(A) and 18(B) are explanatory diagrams of one example of hardware architecture of the base station apparatus.

Finally, one example of hardware architecture to attain the base station 2 and the mobile station 3 described above, will be described. FIG. 18(A) is an explanatory diagram of one example of the hardware architecture of the base station 3 (2). The base station 2 includes a processor 40 serving as a CPU (Central Processing Unit) etc., a storage device 41, and LSI (Large Scale Integration) 42 and a wireless processing circuit 43. The storage device 41 may include a nonvolatile memory, a read-only memory (ROM: Read Only Memory), a random access memory (RAM: Random Access Memory), a hard disk drive, etc. for storing a computer program and the data. The wireless processing circuit 43 may include a digital-to-analog converting circuit, an analog-to-digital converting circuit, a frequency converting circuit, etc.

The operation of the wireless communication unit 10 of the base station 2 depicted in each of FIGS. 6, 11 and 13 is executed by the wireless processing circuit 43. The operations of the reception processing unit 11 and the transmission processing unit 13 are executed by the LSI 42. The processor 40 executes the operations of the data processing unit 12 and the scheduler 14, the operations of the quality information reception unit 15 in FIGS. 6 and 13 and the operation of the position information reception unit 16.

Figure 18B:
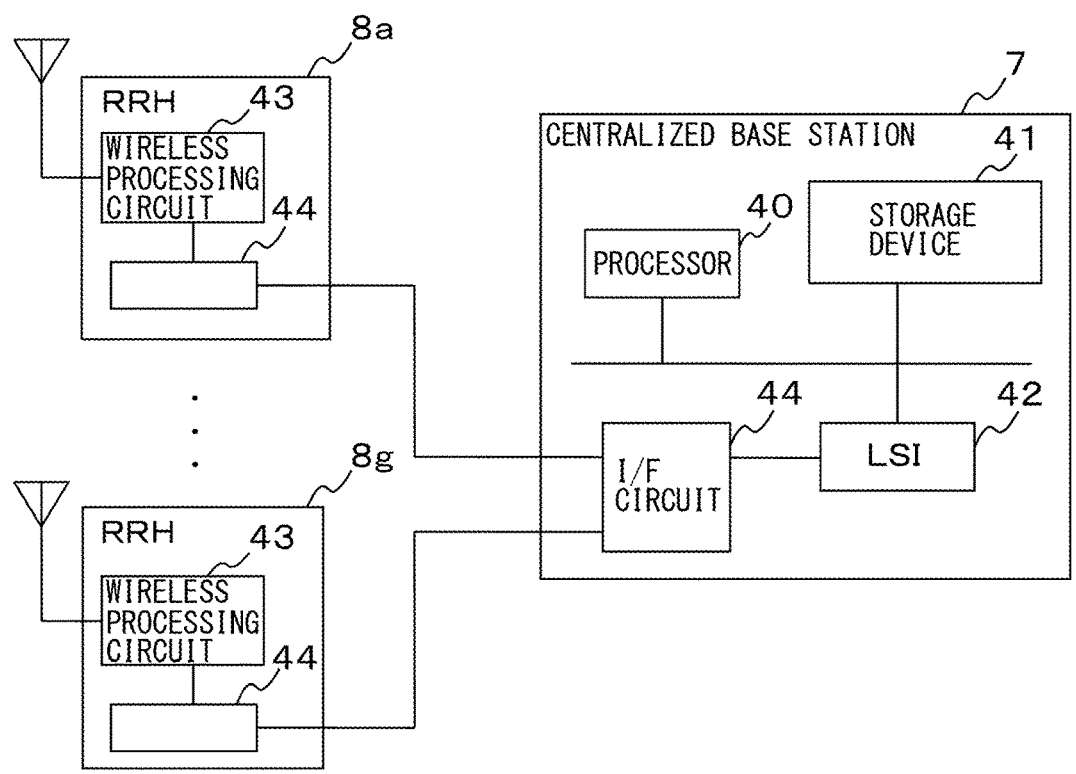

FIG. 18(B) is an explanatory diagram of one example of the hardware architecture of the centralized base station 7 and the RRHs 8a-8g in the configuration of FIG. 3. The processor 40, the storage device 41 and the LSI 42 are provided in the centralized base station 7. The wireless processing circuit 43 is provided in each of the RRHs 8a-8g. Each of the centralized base station 7 and the RRHs 8a-8g includes an interface circuit 44 for establishing the connection between the centralized base station 7 and each of the RRHs 8a-8g. The interface is abbreviated to "I/F" in the accompanying drawings.

The wireless processing circuit 43 executes the operation of the wireless communication unit 10 of each of the RRHs 8a-8g depicted in FIG. 7. The LSI 42 executes the operations of the reception processing unit 11 and the transmission processing unit 13 of the centralized base station 7. The processor 40 executes the operations of the data processing unit 12, the scheduler 14 and the quality information reception unit 15.

Figure 19:
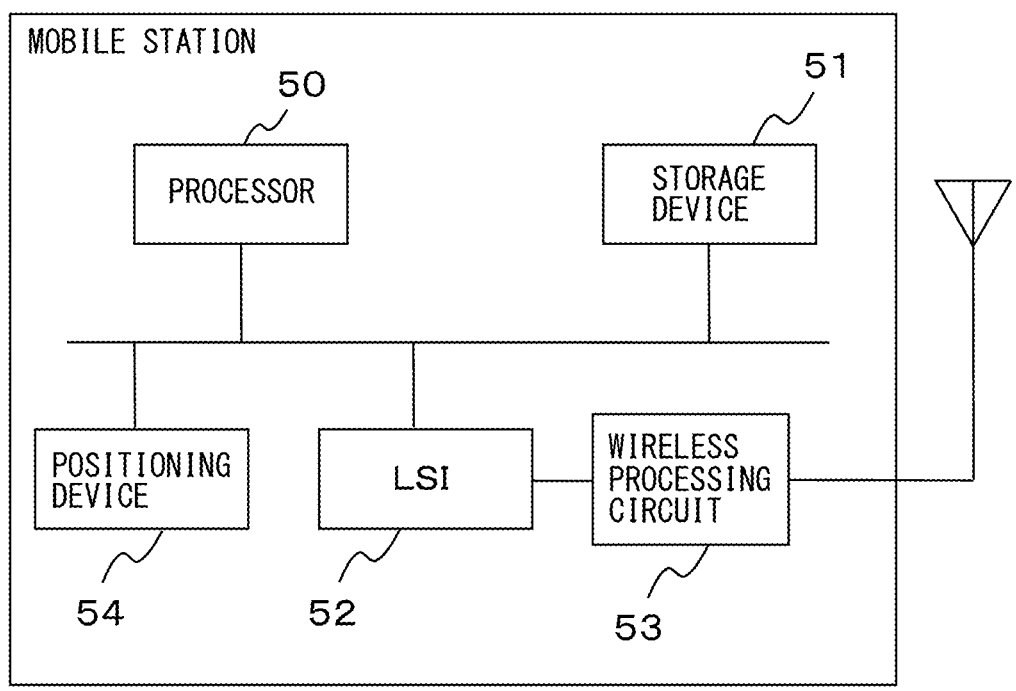
FIG. 19 is an explanatory diagram of one example of hardware architecture of the mobile station apparatus.

FIG. 19 is an explanatory diagram of one example of hardware architecture of the mobile station 3. The mobile station 3 includes a processor 50, a storage device 51, an LSI 52, a wireless processing circuit 53 and a positioning device 54. The storage device 51 may include the nonvolatile memory, the read-only memory, the random access memory, etc., for storing the computer program and the data. The LSI 52 may include an FPGA (Field-Programmable Gate Array), ASIC (Application Specific Integrated Circuit), DSP (Digital Signal Processor), etc. The wireless processing circuit 53 may include the digital-to-analog converting circuit, the analog-to-digital converting circuit, the frequency converting circuit, etc. A GPS (Global Positioning System) positioning apparatus or an inertial navigation system for measuring the position of the mobile station 3 may be one example of the positioning device 54.

The wireless processing circuit 53 executes the operation of the wireless communication unit 30 of the mobile station 3 illustrated in FIGS. 8 and 12. The LSI 52 executes the operations of the reception processing unit 31 and the transmission processing unit 34. The processor 50 executes the operation of the data processing unit 32. The processor 50 and the LSI 52 cooperate to execute the operation of the reception quality measuring unit 33 illustrated in FIG. 8. The positioning device 54 executes the operation of the position measuring unit 35 depicted in FIG. 12.

All of the examples and conditional terms described herein are intended for an educational purpose to assist the readers in understanding the concepts given by the inventors for the sake of the present invention and the developments of the technologies, and may be construed without being limited to the configurations of the examples given in the present specification with respect to the examples and the conditions being specifically described and with respect to indicating the superiority and the inferiority of the present invention. The in-depth descriptions of the embodiments of the present invention have been made; however, it is to be understood that a variety of changes, replacements and modifications can be applied to the present invention without deviating from the spirit and the scope of the present invention.

What is claimed is:

1. A base station apparatus comprising:
a classification unit configured to classify mobile station apparatuses connected to a first cell into a Coordinated Multi-Point transmission (CoMP) target mobile station apparatus and a CoMP non-target mobile station apparatus;
a first allocation unit configured to allocate a wireless resource to the CoMP target mobile station apparatus connected to the first cell; and
a second allocation unit configured to obtain resource information for specifying a wireless resource allocated to a CoMP target mobile station apparatus connected to a second cell different from the first cell and determine a wireless resource to be allocated to the CoMP non-target mobile station apparatus connected to the first cell so as to reduce interference with the wireless resource allocated to a CoMP target mobile station apparatus connected to the second cell.

2. The base station apparatus according to claim 1, further comprising:
a prediction unit configured to predict the interference affecting a CoMP target mobile station apparatus connected to the first cell when the CoMP target mobile station apparatus performs the Coordinated Multi-Point transmission,
wherein the first allocation unit allocates the wireless resource to the CoMP target mobile station apparatus connected to the first cell in accordance with a result of the prediction made by the prediction unit.

3. The base station apparatus according to claim 1, wherein frequency resources different from each other are allocated to the first cell and a second cell, and
the first allocation unit selects the frequency resource to be allocated to the CoMP target mobile station apparatus connected to the first cell from within the frequency resources allocated to the first cell, but does not select the frequency resource to be allocated to the CoMP target mobile station apparatus connected to the first cell from within the frequency resources allocated to the second cell.

4. The base station apparatus according to claim 1, wherein the second allocation unit determines the wireless resource to be allocated to the CoMP non-target mobile station apparatus connected to the first cell at a second cycle after a first cycle based on the wireless resource allocated to the CoMP target mobile station apparatus connected to the second cell at the first cycle in cycles being repeated with a certain period.

5. The base station apparatus according to claim 4, wherein the second cycle for allocating the wireless resource to the CoMP target mobile station apparatus is different from the cycle wherein the second allocation unit determines the wireless resource.

6. The base station apparatus according to claim 5, wherein the second allocation unit determines the wireless resource at a plurality of different cycles based on the wireless resource being allocated at a single second cycle.

7. The base station apparatus according to claim 1, wherein the classification unit classifies the mobile station apparatuses connected to the first cell into the CoMP target mobile station apparatus and the CoMP non-target mobile station apparatus in accordance with a distance between the mobile station apparatus connected to the first cell and the base station apparatus.

8. The base station apparatus according to claim 1, wherein the classification unit classifies the mobile station apparatuses connected to the first cell into the CoMP target mobile station apparatus and the CoMP non-target mobile station apparatus in accordance with a pass loss between the mobile station apparatus connected to the first cell and the base station apparatus.

9. The base station apparatus according to claim 1, wherein the classification unit classifies the mobile station apparatuses connected to the first cell into the CoMP target mobile station apparatus and the CoMP non-target mobile station apparatus in accordance with the reception quality in the mobile station apparatus connected to the first cell.

10. The base station apparatus according to claim 1, wherein data is received to be transmitted to the CoMP target mobile station apparatus connected to the second cell, and
the data is transmitted by use of the wireless resource allocated to the CoMP target mobile station apparatus connected to the second cell.

11. The base station apparatus according to claim 1, further comprising:
a resource information transmission unit configured to transmit, to another base station apparatus configuring the second cell, resource information for specifying the wireless resource allocated to the CoMP target mobile station apparatus connected to the first cell; and
resource information reception unit configured to receive, from another base station apparatus, the resource information for specifying the wireless resource allocated to the CoMP target mobile station apparatus connected to the second cell.

12. The base station apparatus according to claim 11, wherein the resource information transmission unit selects the base station apparatus transmitting the resource information of the wireless resource allocated to the CoMP target mobile station apparatus connected to the first cell in accordance with a degree of interference affecting the CoMP target mobile station apparatus connected to the first cell in a plurality of base station apparatuses configuring cells adjacent to the first cell.

13. The base station apparatus according to claim 1, further comprising:
a first remote wireless device configured to transmit a radio signal and configure the first cell; and
a second remote wireless device configured to transmit a radio signal and configure the second cell.

14. A communication system comprising:
a base station apparatus; and
a mobile station apparatus,
the base station apparatus comprising:
a classification unit configured to classify mobile station apparatuses connected to a first cell into a Coordinated Multi-Point transmission (CoMP) target mobile station apparatus and a CoMP non-target mobile station apparatus;
a first allocation unit configured to allocate a wireless resource to the CoMP target mobile station apparatus connected to the first cell; and
a second allocation unit configured to obtain resource information for specifying a wireless resource allocated to a CoMP target mobile station apparatus connected to a second cell different from the first cell and determine a wireless resource to be allocated to the CoMP non-target mobile station apparatus connected to the first cell so as to reduce interference with the wireless resource allocated to a CoMP target mobile station apparatus connected to the second cell.

15. A communication method comprising:
classifying mobile station apparatuses connected to a first cell and the mobile station apparatuses connected to a second cell into CoMP target mobile station apparatuses and CoMP non-target mobile station apparatuses;
allocating wireless resources respectively to the CoMP target mobile station apparatus connected to the first cell and to the CoMP target mobile station apparatus connected to the second cell;
obtaining resource information for specifying the wireless resource allocated to the CoMP target mobile station apparatus connected to the second cell; and
determining the wireless resource to be allocated to the CoMP non-target mobile station apparatus connected to the first cell so as to reduce interference with the wireless resource allocated to the CoMP target mobile station apparatus connected to the second cell.

* * * * *